United States Patent
Rodriguez Barros

(10) Patent No.: US 9,102,281 B2
(45) Date of Patent: Aug. 11, 2015

(54) REAR-VIEW MIRROR FOR A VEHICLE WITH A SET OF INDICATOR LIGHTS

(71) Applicant: Alejandro Rodriguez Barros, Mollet del Vallès (ES)

(72) Inventor: Alejandro Rodriguez Barros, Mollet del Vallès (ES)

( * ) Notice: Subject to any disclaimer, the term of this patent is extended or adjusted under 35 U.S.C. 154(b) by 178 days.

(21) Appl. No.: 13/789,620

(22) Filed: Mar. 7, 2013

(65) Prior Publication Data

US 2014/0091915 A1    Apr. 3, 2014

Related U.S. Application Data

(63) Continuation-in-part of application No. 12/837,617, filed on Jul. 16, 2010, now Pat. No. 8,568,005, which is a continuation of application No. PCT/ES2009/000017, filed on Jan. 16, 2009.

(51) Int. Cl.
*B60Q 1/26* (2006.01)
*B60R 1/12* (2006.01)
*B60R 1/08* (2006.01)

(52) U.S. Cl.
CPC ............ *B60R 1/1207* (2013.01); *B60Q 1/2665* (2013.01); *B60R 1/08* (2013.01); *B60R 1/082* (2013.01)

(58) Field of Classification Search
CPC ........ B60Q 1/2665; B60R 1/08; B60R 1/081; B60R 1/082
USPC .................. 362/516, 494, 540, 545; 340/575; 359/841
See application file for complete search history.

(56) References Cited

U.S. PATENT DOCUMENTS

| | | | |
|---|---|---|---|
| 4,890,907 A * | 1/1990 | Vu et al. .......................... | 359/843 |
| 5,871,275 A * | 2/1999 | O'Farrell et al. .............. | 362/494 |
| 6,176,602 B1 * | 1/2001 | Pastrick et al. ............... | 362/494 |
| 6,280,068 B1 | 8/2001 | Mertens et al. | |
| 6,402,354 B1 * | 6/2002 | Tatewaki et al. .............. | 362/490 |
| 6,811,288 B2 * | 11/2004 | Hutzel ........................... | 362/494 |
| 6,919,796 B2 * | 7/2005 | Boddy et al. ................. | 340/425.5 |
| 6,926,431 B1 * | 8/2005 | Foote et al. ................... | 362/494 |
| 6,926,432 B2 | 8/2005 | Rodriguez Barros et al. | |
| 6,986,596 B2 | 1/2006 | Evans | |
| 7,080,913 B2 | 7/2006 | Henion et al. | |

(Continued)

FOREIGN PATENT DOCUMENTS

| | | |
|---|---|---|
| ES | 2139486 A1 | 2/2000 |
| WO | 2004024502 A1 | 3/2004 |

(Continued)

*Primary Examiner* — Peggy Neils
(74) *Attorney, Agent, or Firm* — Hess Patent Law Firm LLC; Robert J. Hess

(57) ABSTRACT

It comprises a main mirror (G1) having a first field of view and a spotter mirror (G2) having a second field of view, placed at different levels and connected by a step or partition (St) and a first indicator light (Li1) in association with a light source (30), said indicator light issuing at least a light beam directed towards a driver eyes (Dv) intended to highlight or demarcate said spotter mirror (G2) making it easier the driver to focus on it in response of an action of the driver, detection of an approaching vehicle or a vehicle advancing, or in response to a turning maneuver without turning signalization and a second indicator light (Li2) activated in response to a light turn signal activator. The indicator lights (Li1) and (Li2) are located in said step of the spotter mirror, or near the frame of the mirror, in a shadow area (18*a*, 18*b*) so that the incident daylight (Ob1) or incident external light does not disturb the perception of said indicator lights (Li1), (Li2) by a driver.

28 Claims, 18 Drawing Sheets

(56) References Cited

U.S. PATENT DOCUMENTS

| | | |
|---|---|---|
| 7,626,749 B2 * | 12/2009 | Baur et al. .................... 359/265 |
| 7,674,025 B2 | 3/2010 | Liesener |
| 7,850,350 B2 | 12/2010 | Weller et al. |
| 2001/0010633 A1 | 8/2001 | Apfelbeck |
| 2002/0041442 A1 * | 4/2002 | Witt ............................. 359/603 |
| 2003/0206417 A1 | 11/2003 | Pastrick et al. |
| 2004/0114384 A1 * | 6/2004 | Carter et al. .................. 362/494 |
| 2006/0012990 A1 | 1/2006 | Walser |
| 2007/0279923 A1 | 12/2007 | Rodriguez |
| 2008/0068851 A1 * | 3/2008 | Waldmann .................... 362/494 |

FOREIGN PATENT DOCUMENTS

| | | |
|---|---|---|
| WO | 2007080439 A1 | 7/2007 |
| WO | 2009090285 A1 | 7/2009 |

* cited by examiner

Fig.6, (A-A)

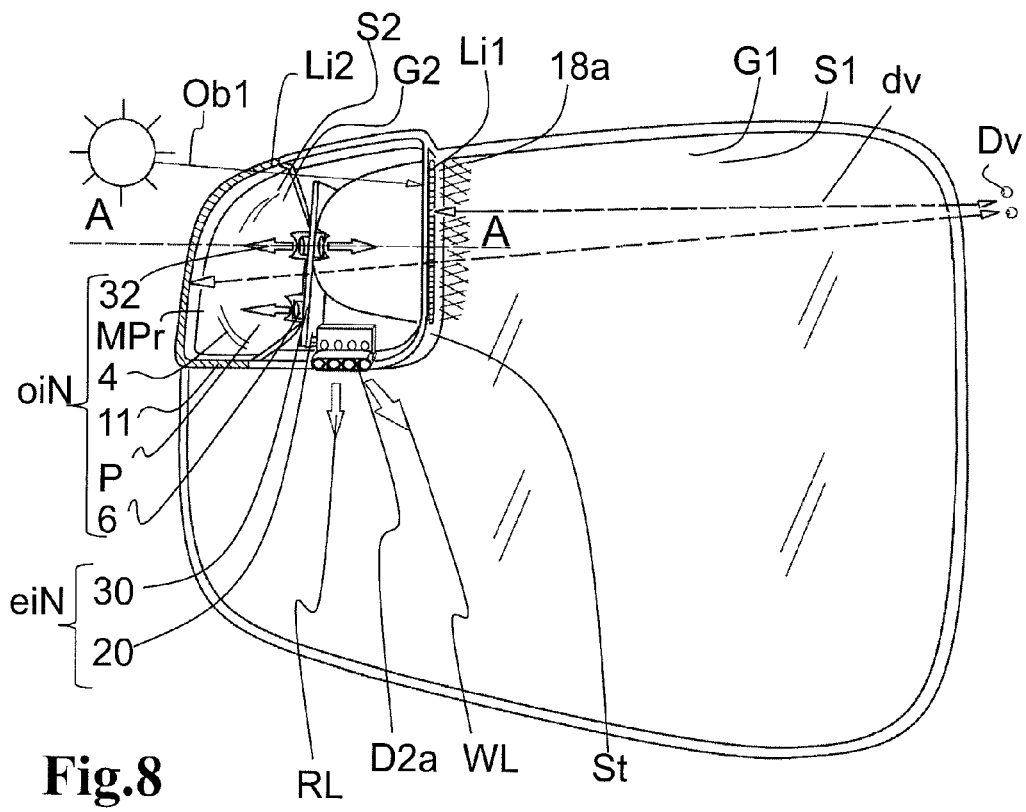
Fig.8
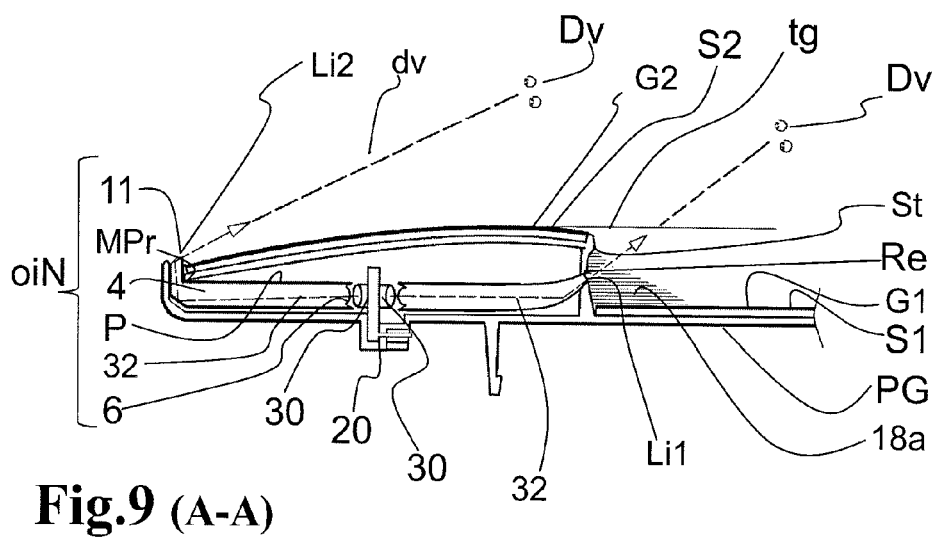
Fig.9 (A-A)

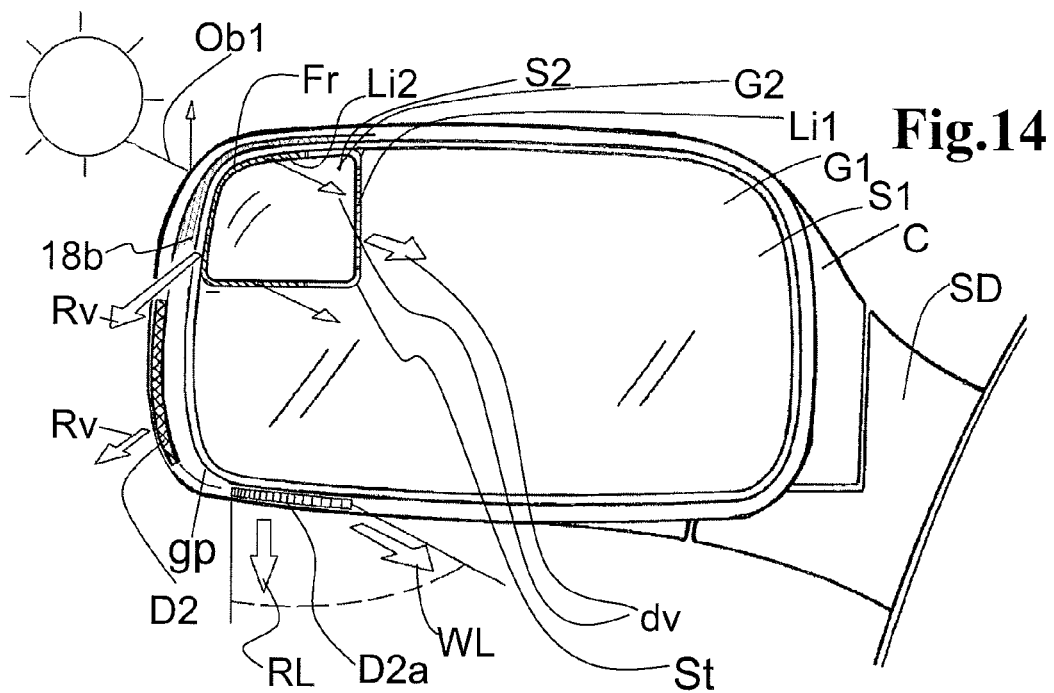
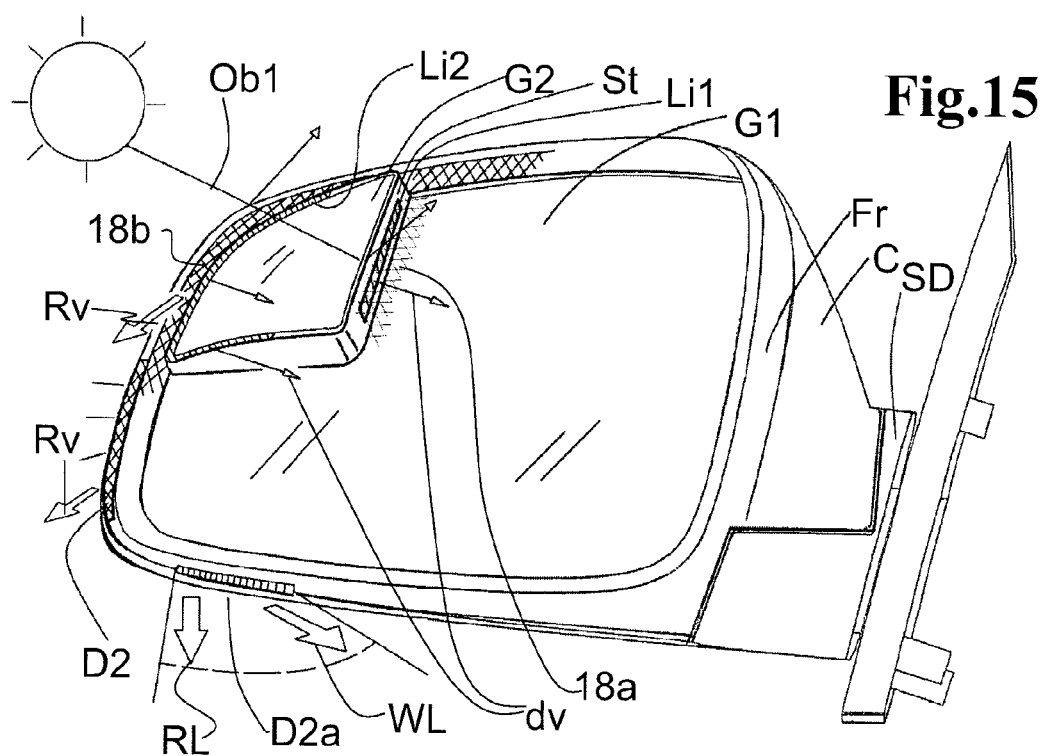

Fig. 23, (A-A)

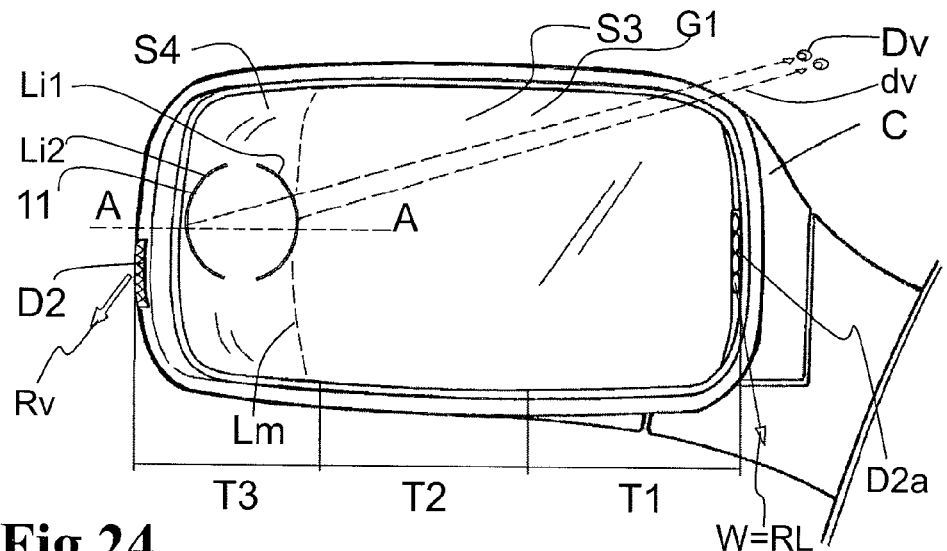
Fig.24
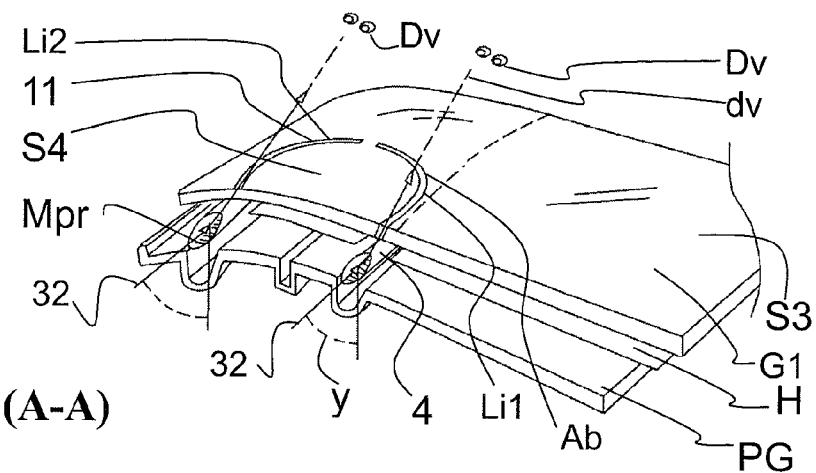
Fig.25 (A-A)
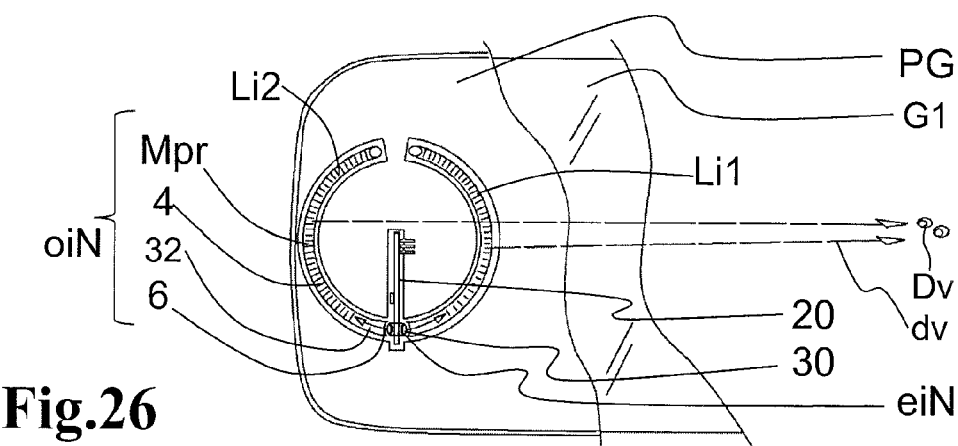
Fig.26

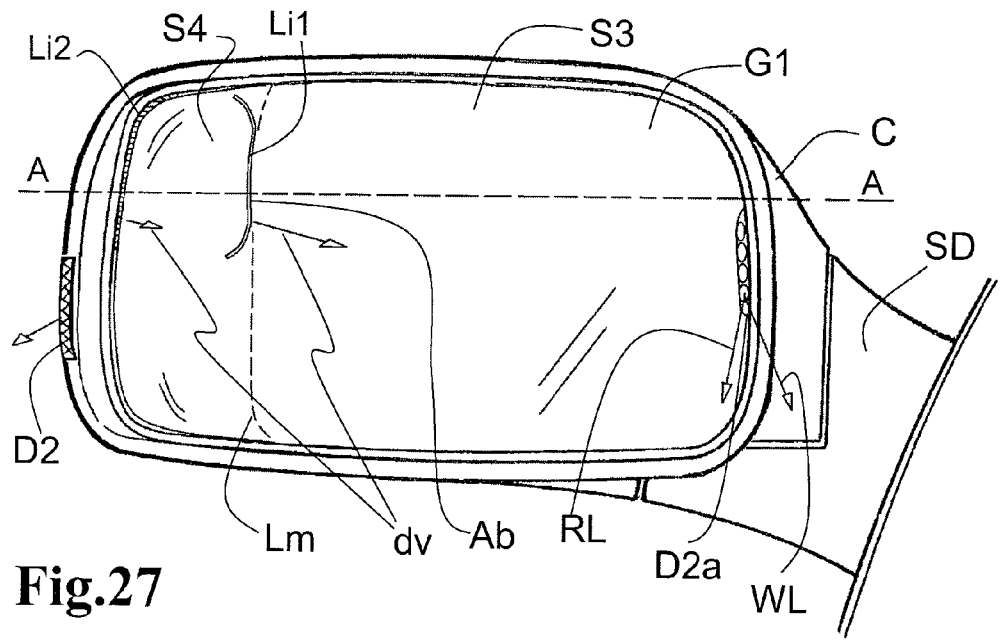
Fig.27
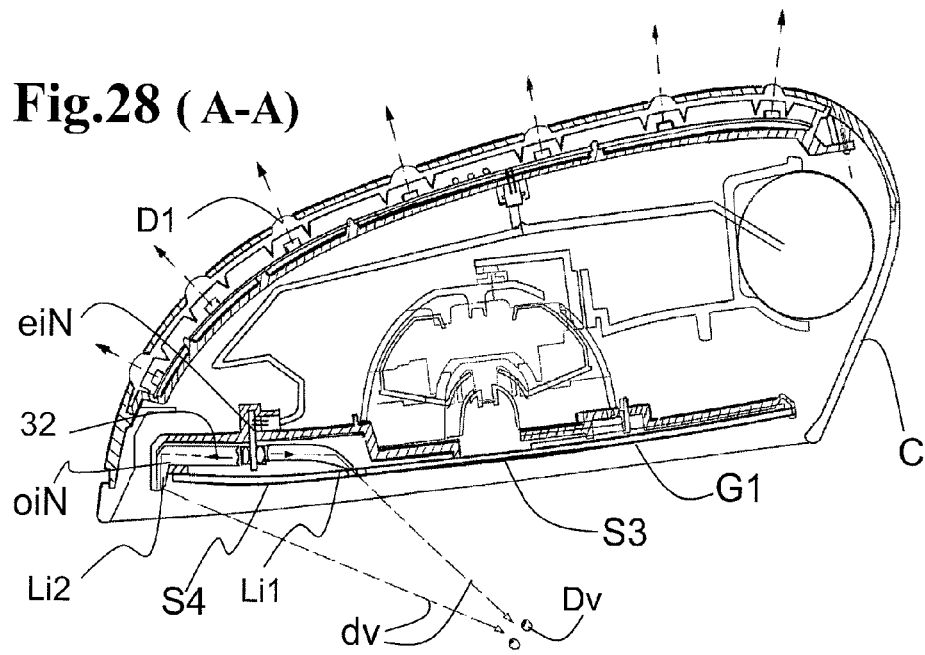
Fig.28 (A-A)

REAR-VIEW MIRROR FOR A VEHICLE WITH A SET OF INDICATOR LIGHTS

FIELD OF THE INVENTION

The present invention relates to a rear-view mirror assembly for a vehicle that comprises a subassembly including two mirrors, one generally flat and another auxiliary or spotter mirror with a different inclination and radius of curvature between them, in order to widen the field of view of said rear-view mirror and around said spotter mirror one or more light devices that provide an indicator light directed toward the driver eyes that highlight or demarcates the position of said spotter mirror capturing the attention of the driver toward it. The light devices associated to the spotter mirror are located in shadow areas so that the incident daylight (Ob1) or external light does not disturb the perception of said indicator light by the driver.

The referred indicator lights can perform several warning and comfort functions assisting in a safe driving.

BACKGROUND OF THE INVENTION

Several patents of rearview mirror assemblies with an incorporated turn signal emitting said signal in three directions, forward, side and rear, are known such as ES 1019238 U; AR 247154 and U.S. Pat. No. 6,926,432 of the present inventor.

Patents are also known which make reference to the intermittent signals in a mirror reflector element or of indicators in the middle of the reflector mirror, such as U.S. Pat. No. 5,355,284 (Muth), U.S. Pat. No. 7,427,150 (Gentex) that emit a light signal visible by the eyes of the driver, but even though they produce light emission for indirect vision and it is not aggressive to the eyes of the driver, the lighting of the mirror by the dichroic properties of the glass make it difficult, especially at night, to see the reflected image by overlapping image-light.

Subassemblies of associated mirror reflectors, that have an additional auxiliary spotter mirror fixed to the body, frame or the same main mirror to enlarge the field of view are disclosed in U.S. Pat. No. 7,156,532, U.S. 2010/0128373, U.S. Pat. No. 7,216,993; U.S. Pat. No. 6,979,092, U.S. Pat. No. 5,784,211, and U.S. Pat. No. 7,267,449.

DE10200503818 from AUDI discloses warning lights in response to an external sensor of a vehicle but said warning lights are located outside or next to the element of the reflector mirror, therefore, to focus the image, you must see before a first point of attention, the warning, and later a second or third different point of attention to analyze the images of both mirrors, this is distracting, it creates doubts and gives less time to look ahead.

One problem is that, when driving, the driver focuses his attention to the front, and when he needs to use the mirrors; the driver knows that, for a moment, he stops paying attention to the front. If the attention is diverted first by a warning indicator light and later by a second or third point of attention, to analyze two related images but of different sizes and orientations, as the ones that reflect a main mirror and an auxiliary spotter mirror, it increases the stress, the doubts and the risk of an accident because he is aware that the lack of attention to the front lasts longer.

Another problem when driving derives from the need to warn other vehicles about the movements of the own vehicle at the same time as receiving fast movement information from the nearby vehicles, which can be summarized as "to see and to be seen" in a simple and fast way, and said measures being effective both day and night.

U.S. Pat. No. 6,919,796 discloses a rearview mirror comprising a spotter mirror for providing an image of an object in a vehicle's blind zone to the vehicle's operator, including a recognition enhancement device with the spotter mirror for drawing the attention of the driver to the spotter mirror when an overtaking vehicle enters the driver's blind zone. However the provided solution is not operating properly under both daylight and in the frequent situations of external light changes during driving.

Also of interest appears to have a light illuminating the bodywork or side of the vehicle in order to allow avoiding obstacles when parking or when boarding the vehicle.

SUMMARY OF THE INVENTION

The present invention provides a rearview mirror assembly for a vehicle comprising a first reflective element or main mirror and a spotter mirror with one or more indicator lights directed to the driver eyes with the aim of highlighting said spotter mirror in response of an action of the driver or a detection of an approaching vehicle, said indicator light being so located that can properly be perceived by a driver drawing his/her attention towards the spotter mirror under all lights conditions: intense day light, changes of external light, down lighter, etc.

Referred indicator light emits a beam of light oriented to the eyes of the driver, according to several functions selected from:

light that automatically catches the attention of the driver toward the spotter mirror as a response to the use of the turn signal, making him notice the image reflected in said spotter mirror and in the main mirror;

light that automatically catches the attention of the driver toward the spotter mirror in response to a turning maneuver, at any speed, even if turn lights are inadvertently not activated by the driver;

light of warning demarcating the spotter mirror of a first vehicle as a response of an external system of detection of a second approaching vehicle located in blind zone or detection of a vehicle that is moving forward located in a parallel lane, within the spotter area of vision, and informing about the lane;

warning light demarcating of the spotter mirror activated before or after the opening of the door of the vehicle.

Besides other auxiliary lights providing a comfort function are also placed associated to the spotter mirror, also shadowed, for the following functions:

light that illuminates the door of the vehicle before boarding it, light that illuminates a side of the body of the vehicle when using the reverse gear, without having a direct impact in the eyes of the driver.

In a more general embodiment several light emitters are arranged in the vicinity of the spotter mirror's perimeter, projecting an indicator light toward the eyes of the driver acting as a marking, indicating, warning or targeting device, allowing to see and quickly center or capturing the attention of the driver towards the spotter mirror's reflected image, so the driver only need a single deviation of attention to the front to make a decision without hesitation and without having to analyze the two images of the main and adjacent (spotter) mirrors, resulting in a more efficient mirror assembly to see and to be seen.

The rear view mirror of this invention also includes some additional light devices that are used to illuminate a dark lateral side of the vehicle allowing clearly perceive the door handle when boarding the vehicle, or the side body of the car when using the reverse, functions that have not been integrated in the past in a mirror housing, due to the additional needs of space that impose as well as for the constructional costs (molds, cavities for lodging the light emitters, etc.).

The proposed rear-view mirror presents a main mirror and an associated auxiliary spotter mirror having a different orientation and radius of curvature, amplifying the reflected image and that includes at least in a part of said perimeter of said spotter mirror, a lighted device issuing an indicator light for demarcating, indicating, warning, focalizing a centering the reflected image to differentiate it from the image on the main mirror because both images are of different sizes and focus between both said two mirrors, and that emits light, shadowed against external light, oriented to the eyes of the driver, according to a series of functions above disclosed.

Said lighted devices occupy at least some of the perimeter of the auxiliary spotter mirror, and guarantee its efficiency against any outdoor light conditions (sunlight, external intensive illumination, etc.) because they have been placed in a shadow area, either in a step between the main and spotter mirror or close to the frame of the mirror housing.

Said main mirror and auxiliary spotter mirror use the demarcating, indicating, warning and focalizing light devices combined with different functions such as the turn signal, a sensor detecting a turning maneuver without signalization at any speed either near zero, the response to the detection of a peripheral detecting system of the vehicle, sensors for the opening of the door and incorporate a third or fourth light device with some other comfort functions like illuminating the handle of the door when boarding the vehicle, or illuminating the side of the body of the vehicle when using the reverse gear or when switching on the lights inside of the vehicle.

The connection of the related functions of the rear-view mirror is made through a direct cable of the general electrical system of the vehicle, or by a wireless system, when emitting a radiofrequency signal of an associated device located in any part of the vehicle when the related functions (turn signal, reverse gear, peripheral sensors, door sensors) are activated and transmitted to a controlling receptor close to the mirror assembly or to the corresponding door.

The present invention relates to an exterior multisignal rear-view mirror assembly for a vehicle, comprising:
- a mirror housing; composed of structural parts: a cover, frame and support fixed to the vehicle,
- a first reflective element or main mirror, having a first field of view;
- a second auxiliary reflective element or spotter mirror having a second field of view,
- said main mirror and said spotter mirror being at different levels and connected by a step or partition;
- an indicator light with a light source, said indicator light issuing at least a light beam directed towards the driver eyes intended to highlight said spotter mirror in response of an action of the driver or a detection of an approaching or moving forward vehicle,
- said indicator light being located in said step of the spotter mirror, or in a zone in the vicinity of the spotter mirror near the mirror's frame, shadowed so that the external light does not prevent a clear vision of said indicator light.

Rear-view mirror assemblies with a built-in turn signal emitting said signal in three directions, i.e. towards the front, towards the side and towards the rear are known in the market. In order to produce these three emission directions of one and the same signal, these rear-view mirrors have a single light module emitting through a window closed by an outer transparent cover extending from the front part, opposite the main plate glass, to the end farthest from the bodywork, where they have a projection, unevenness or a shape which allows emitting the light towards the rear.

The present invention is based on an exterior multisignal rear-view mirror assembly for a vehicle, comprising:
- a structural part with a frame defining the contour of a first opening towards the rear, with reference to the axis of travel of the vehicle in its normal traveling direction, which encompasses a main mirror;
- at least one second front opening or window for the passage of light, at an outer wall of a casing or housing of said rear-view mirror assembly, in an area opposite said main mirror;
- a first light module suitable for emitting at least one first turn signal through said second opening or window for the passage of light, encompassing a light emitting extension at least in a horizontal plane between a direction towards the front and towards the side, with reference to said axis of travel of the vehicle in its normal traveling direction; and
- a second light module suitable for emitting at least one second turn signal at least towards the rear, synchronized with said first turn signal for producing one and the same function, said second light module being independent in construction from the first light module and being located in a portion of said structural part forming a frame or in a portion of a part of the rear-view mirror assembly adjacent to said structural part forming a frame.

For one embodiment, said light modules are electrically interconnected and controlled by a control system for emitting respective light signals in unison or synchronously.

BRIEF DESCRIPTION OF THE DRAWINGS

The features of the invention will be better understood from the attached illustrative and non-limiting drawings. It is understood that a person skilled in the art can obtain a similar product based on such drawings by association or relating similar elements, or by varying the design, without departing from the scope of the present invention:

FIG. 2 is a top view similar to that of FIG. 1 with additional indication of light device D2a.

FIG. 8 is a perspective view of the rear-view mirror with indication of constructive details of spotter mirror G2.

FIG. 9 is a cross section along A-A of the spotter mirror G2 of FIG. 8.

FIG. 14 is an elevation view of an embodiment of the rear-view mirror of this invention with main G1 and spotter mirror G2 constituted by independent bodies and FIG. 15 is a perspective view of this embodiment showing light indicators placed at the step between the two mirrors G1 and G2.

FIG. 18 is an elevation view of another embodiment of the rear-view mirror of this invention with a light indicator in vicinity of spotter mirror G2 and near to outer frame of the mirror housing and light modules D2 and D2a.

FIG. 24 is an elevation view of another embodiment of a mirror assembly which has an aspherical mirror as the one in FIG. 23.

FIG. 25 is a perspective view of cross section by A-A of FIG. 24.

FIG. 26 is a detail showing the electrical and optical interfaces used in the embodiment of FIG. 24.

FIG. 27 is an elevation view of an embodiment with an aspherical mirror and a spotter mirror demarcated by two lines.

FIG. 28 is a cross section (A-A) of FIG. 27.

DETAILED DESCRIPTION OF SEVERAL EMBODIMENTS

Figure 3:
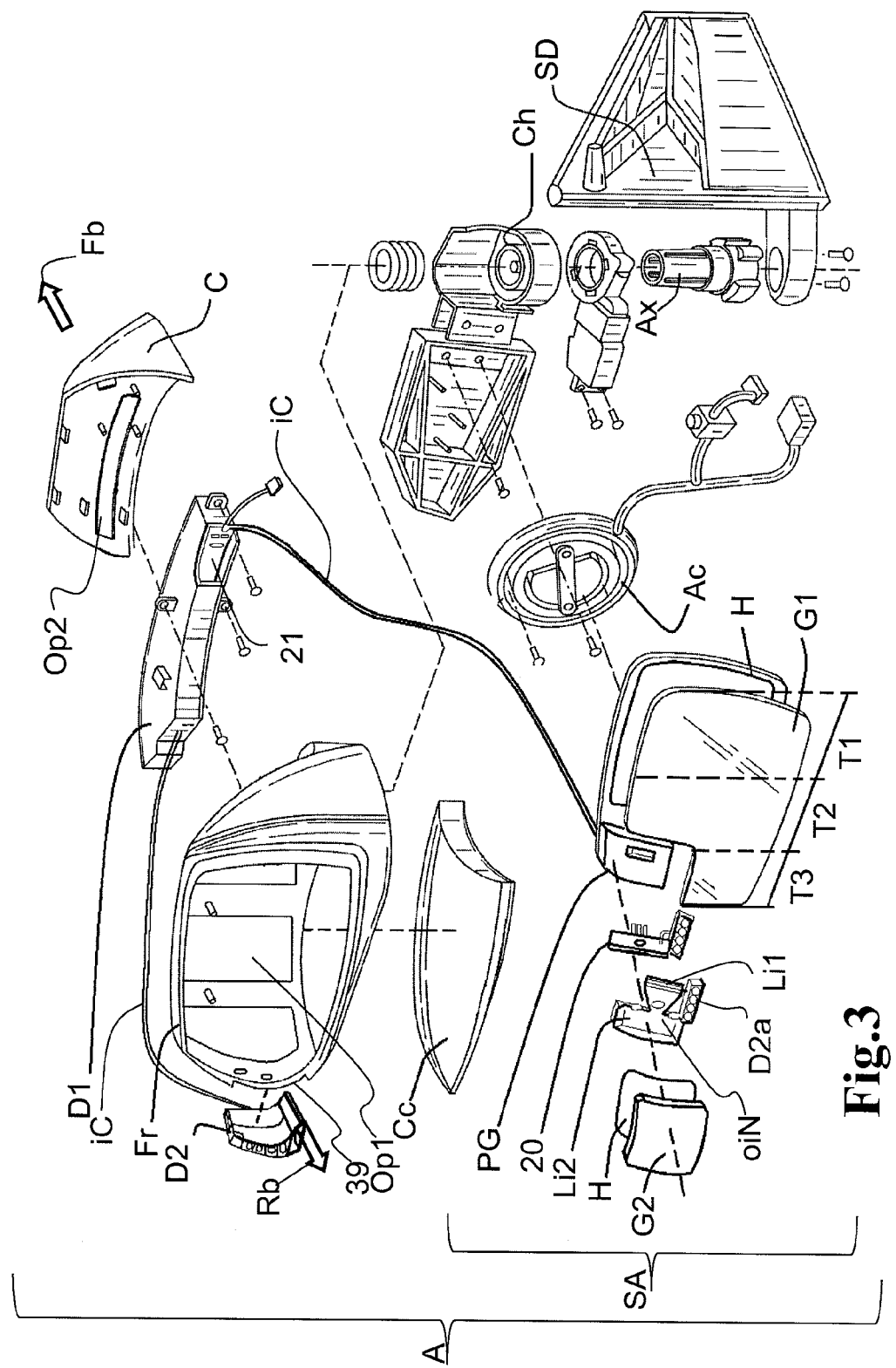
FIG. 3 is an exploded perspective view of a multisignal rear-view mirror assembly according to the invention.

The multisignal rear-view mirror assembly A of FIG. 3 include a front light or signal module D1 and a rear light or signal module D2, and a subassembly SA comprising two glass plates or mirrors G1 and G2 including an electro optical interface oiN, a circuit 20, support PG of said glass plates G1 G2, a heater H and a light device D2a connected through cable iC to the device D1 that includes a protection or dimmer circuit 21 as anti theft device. Light device D2a produces welcome light WL and reverse light RL as well as indicator light Li1 and Li2 (they can share a light source or have independent light sources). A heater H is associated with the mirrors G1 and G2.

Figure 4:
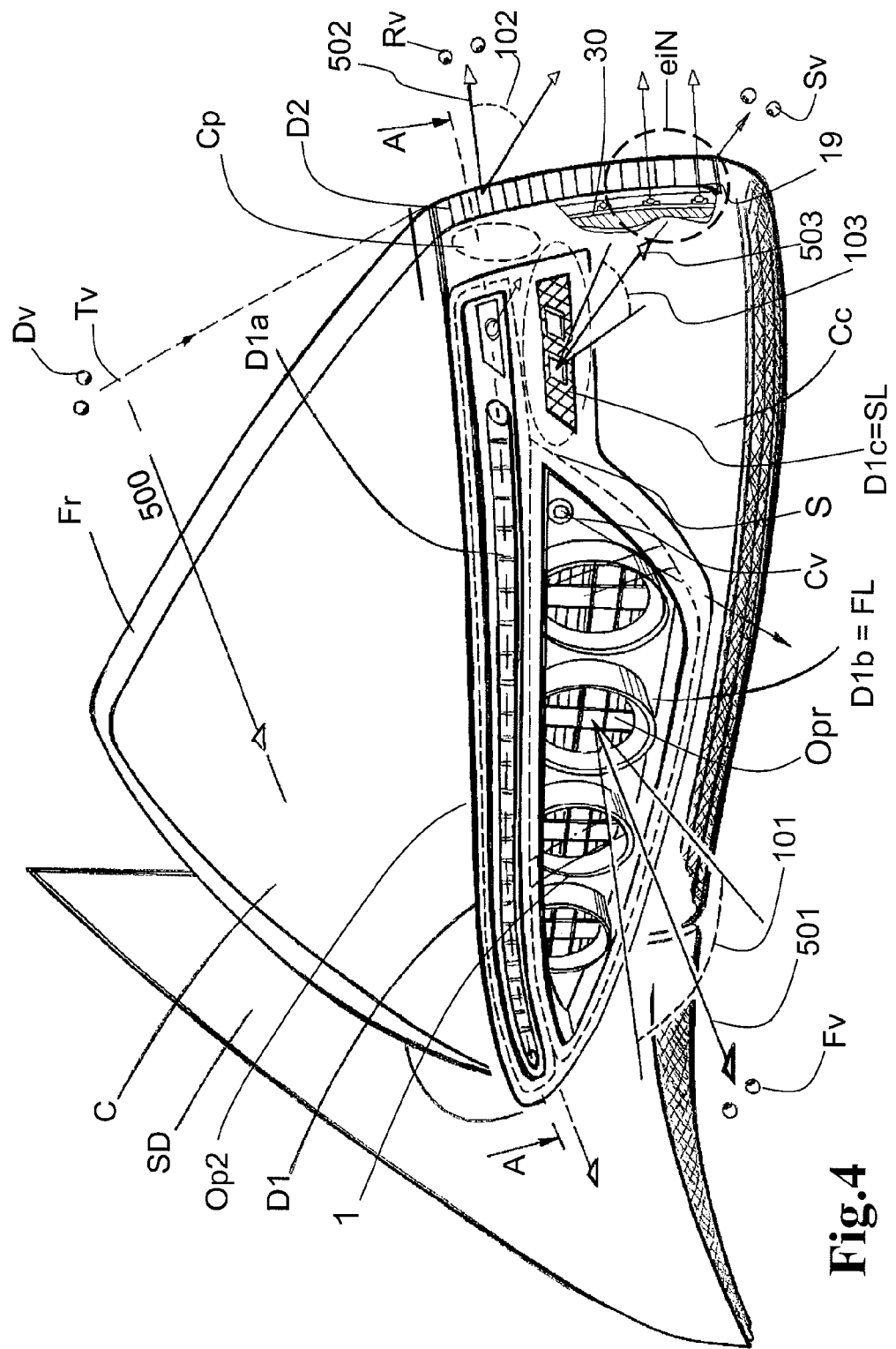
FIG. 4 is a front perspective view of a multisignal rear-view mirror assembly with a front light or signal module D1 and a light module providing a signal to the rear of the vehicle.

The front part visible of the mirror is divided into three thirds T1, T2, T3, where one third T3 is the area farthest from the bodywork car which preferably includes the second signal module D2, and the spotter mirror G2 which has associated the indicator or demarcation lights Li1, Li2 and auxiliary light D2a;

The multisignal rear-view mirror assembly of FIG. 4 comprises a front module D1 showing a dotted line on separating surfaces S of cavities of different functions, devices or modules D1a, D1b, D1c; it shows in a transparent area a detail of the electro-optical interface eiN, (LEDs 30, circuits 20) of a module towards the rear D2, and an opaque area Cp, interpolated between the modules as a protection against outdoor light and blows. The mirror housing has in its frame Fr a turn signal device D2 that emits the signal backwards 502 and is visible through the Rv eyes. When said cavities of the front light module D1 are integrated under one and the same transparent cover 1, they have a part of the inner body 10 or reflector 12 which, due to its design, approaches said transparent cover forming a surface S parallel to said transparent cover the function of which is to establish a separation between said cavities or functions, and is graphically represented with a dotted line according to FIG. 4.

Figure 5:
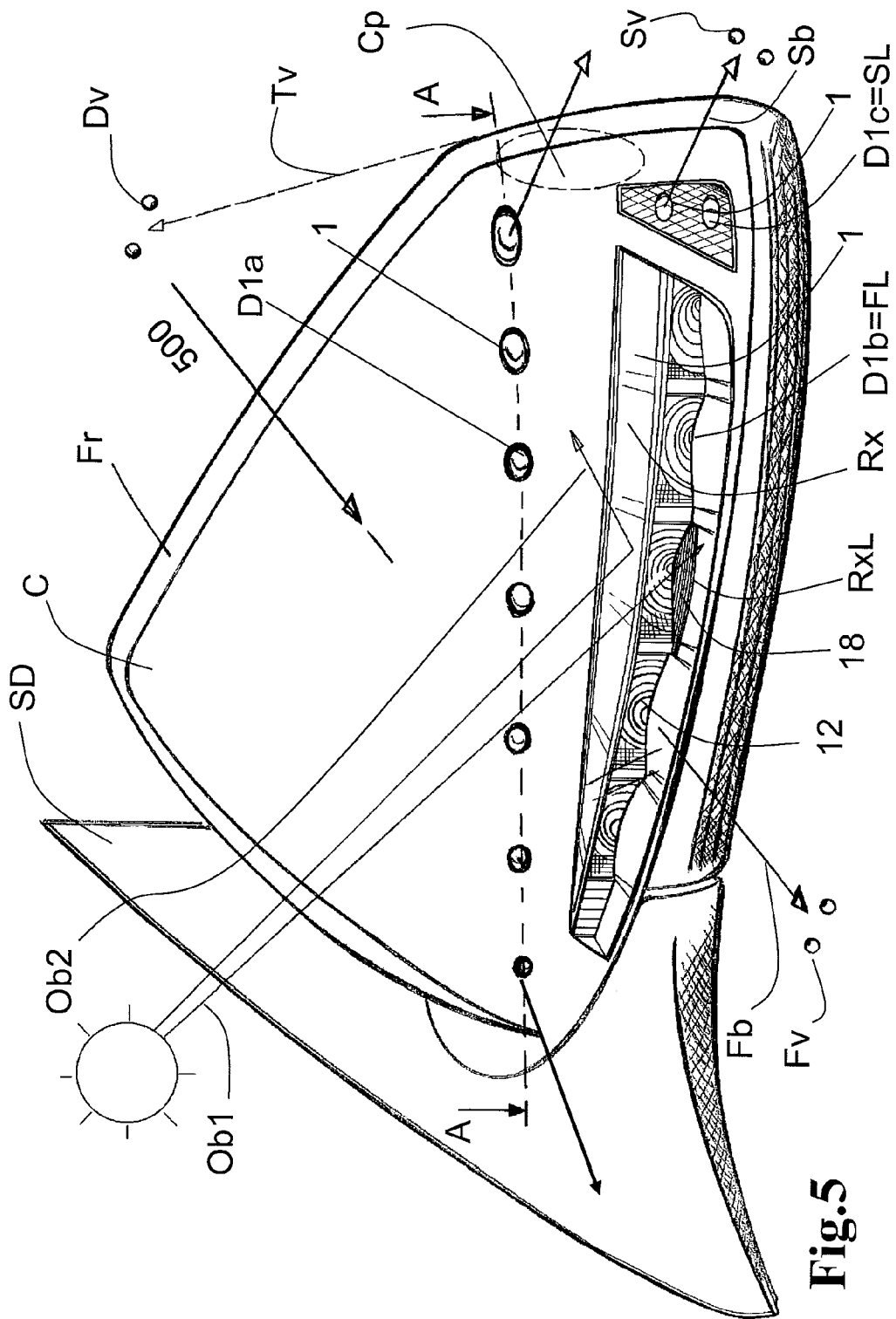
FIG. 5 is a front perspective view of a multisignal rear-view mirror assembly with an alternative light or signal module D1b for front emission.

In the multisignal rear-view mirror assembly of FIG. 5 the front emissions are formed by signal modules or devices D1a, D1b and D1c with their cavities and light outlet windows all separated from one another.

Figure 6:
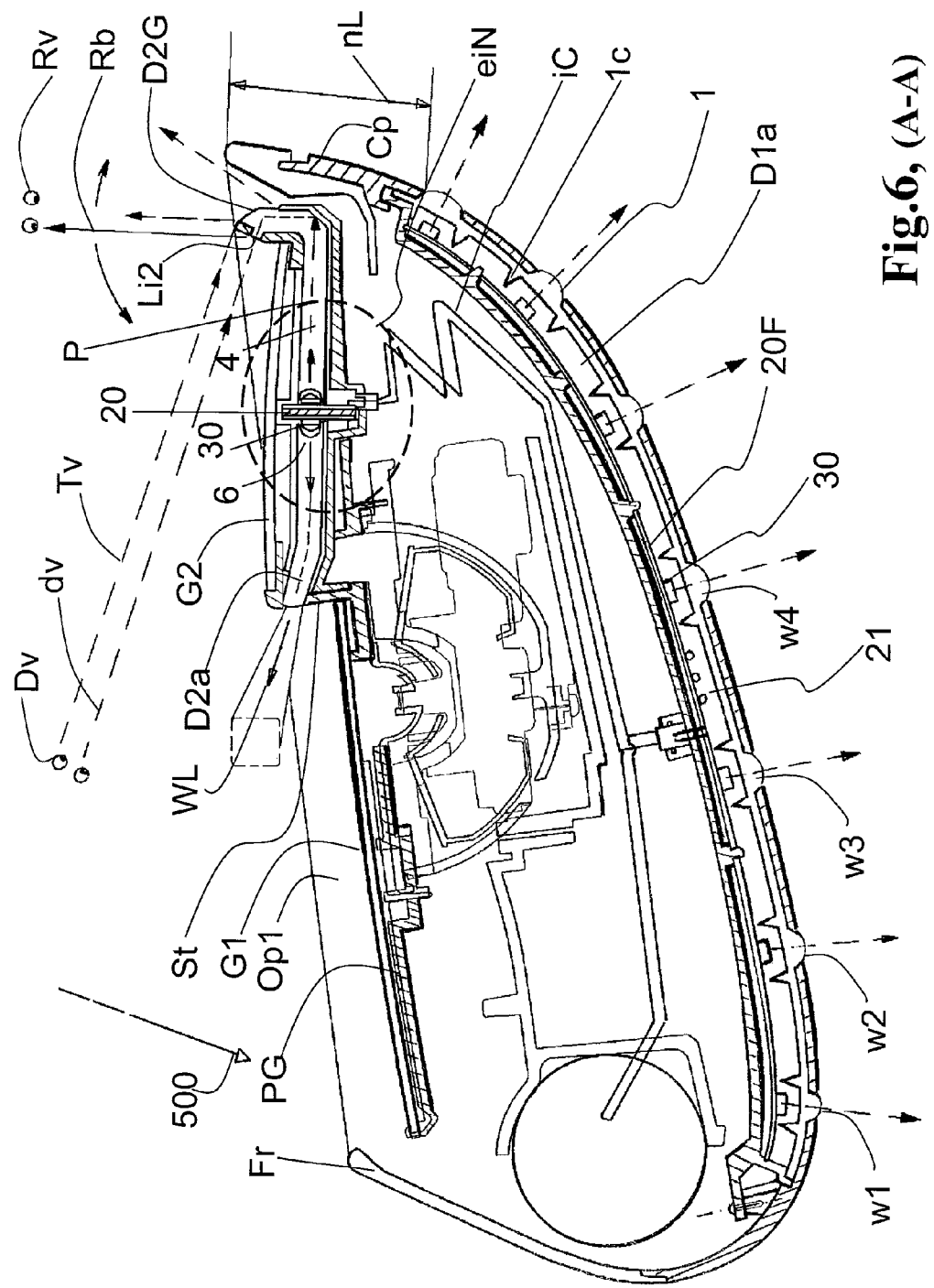
FIG. 6 is a cross-section view taken along lines (A-A) of FIG. 5 shoving light modules D1a (front), D2G (rear) and D2a (welcome light).

In FIG. 6 the plate glass PG holds main mirror G1 and the spotter mirror G2, with the outlet of a light device D2a directed towards the door by means of the beam WL from the step St between said two plate glasses G1 and G2, the outlet signal D2G visible from the rear Rv, and the demarcation light Li1, visible the driver eyes Dv and turn signal D2G.

Figure 7:
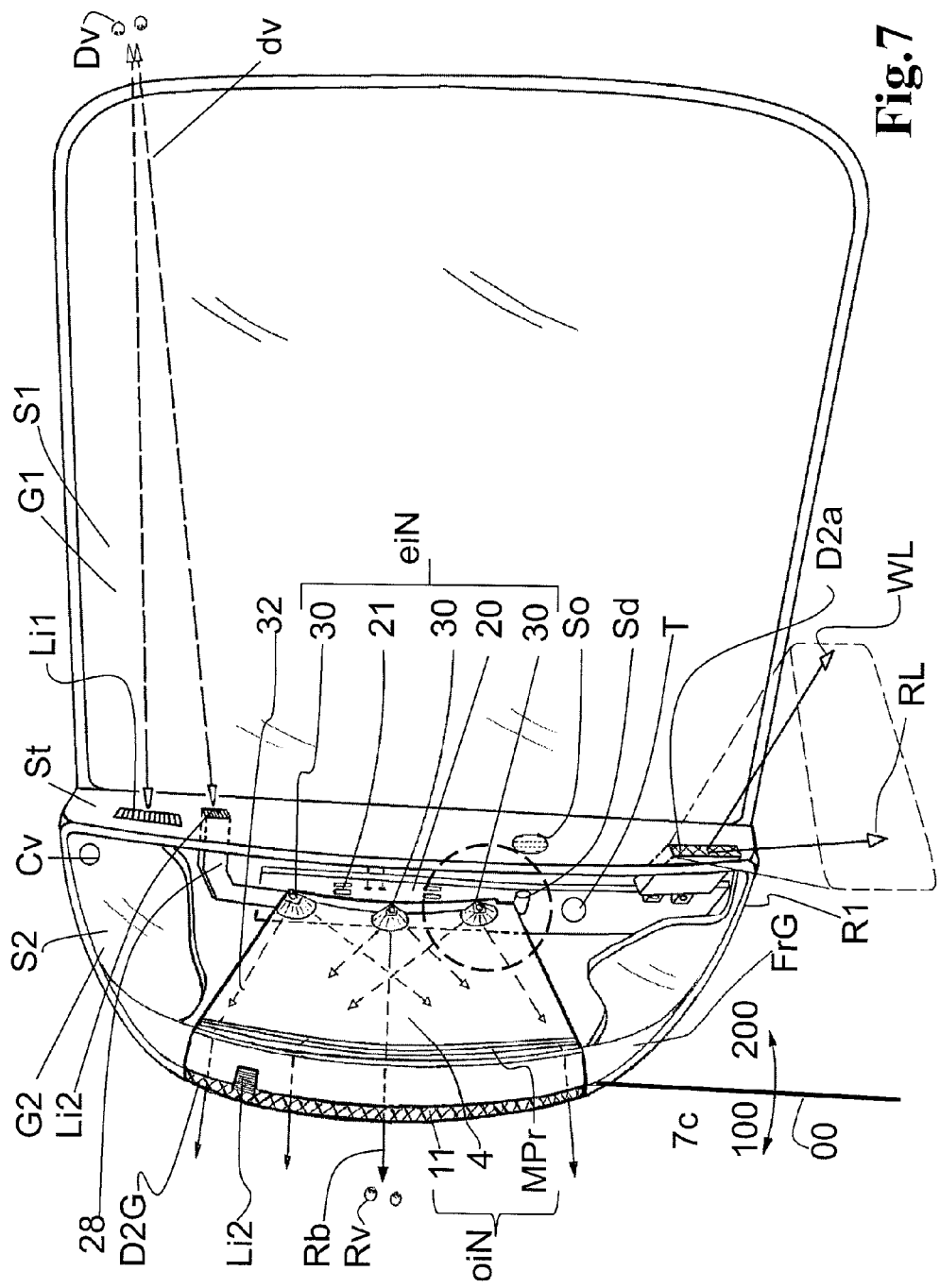
FIG. 7 is a perspective view of the subassembly of the rear-view mirror here proposed including glass plates or mirrors G1 (main) and G2 or spotter mirror and arrangement of light indicators Li1, Li2.

The subassembly SA of FIG. 7, including mirrors G1, G2, separated by step St providing glass or mirror surfaces S1 and S2 show:

- an interface eiN formed by an optical body 4 and a light source 30
- a small window with indicator light Li1 emitted through a transparent surface 11;
- a light illuminating the door WL, or reversing light RL and the operating indicator light Li2 emitted by the light module D2a, all of said lights issuing from the step St,
- a camera Cv forming part of the interface of a detection system associated with said indicator signal Li2;
- the sound outlet So of an emitting device Sd, and
- a temperature sensor T integrated in the electronic interface eiN.

To better understand several embodiments, before further explaining in detail the operation and constructive features of the mirror assembly and mirror subassembly, signal modules, light indicators and light modules, locaters, or operating indicators or welcome light used, reference is made to:

1.0. Points of view surrounding the signals, light indicators, areas of light and shadow, directions, angles and emission patterns, main beams and axes of reference of the vehicle.

2.0—Signal modules of the rear-view mirror, features, and extension of transparent surfaces or windows.

2.1. —Types of signals and indicator lights: Location, cavities, separations, insertion, fixing, independent modules, integration of signals in a module and integration of signals in structural parts of the rear-view mirror.

3.0. —Protection of the signal modules against blows.

3.1.—Protection against the incidence of outdoor light during the day and contrast.
3.2.—Protection against overheating. Cooling.
4.0.—Locaters, operating indicators, acoustics, sensors.
4.1.—Cameras, intrusion detectors, sensors.

DEFINITIONS 1.0.—In the multisignal rear-view mirror assembly it can be indicated (see FIGS. 1, 2, 4-6 and 22):

A position projecting on the side with respect to the bodywork of the vehicle Car which allows projecting a horizontal light area 100 towards the exterior side of the bodywork, limited by a line 00 with respect to a shadow area 200 towards the interior of the bodywork; inside said light area 100 the following points of view of reference and towards the front Fv, side Sv, and rear Rv are visible; and a point of view of the driver Dv which is inside said shadow area 200, from which there is perceived a tangential vision Tv of the light outlet of the second signal module D2 which emits towards the rear and/or a direct view dv of a operating indicator signal of the turn signal produced by said second module D2 through a small window Sw located in the inner part Fri of said frame-casing Fr, or there is perceived a cavity or sub-module Li2 producing an operating indicator signal independent from the source of said turn signal.

Rv means eye points, located behind the vehicle and outside, parallel, to axis 500, an axis 500 of circulation of the vehicle, an axis 501 passing through the front module and parallel to the axis of circulation, an axis 502 passing through the signal module towards the rear D2 and is parallel to the axis of travel but in the opposite direction, an axis 503 perpendicular to the axis of travel and passing through the rear-view mirror assembly in the cavity producing the side signal SL and, an extreme tangential line XL parallel to the axis of travel and defining the end of the vehicle receiving blows, scrapes and scratches.

The directions and angles of emission of the signals according to their main beams are:

Fb: direction of front emission "front beam" towards the eye points Fv parallel to the axis 500 of the vehicle.

Sb: direction of side emission "side beam" towards the eye points Sv perpendicular to the axis 500 of the vehicle.

Rb: direction of rear emission "rear beam" towards the eye points Rv parallel to the axis 500 of the vehicle but in the opposite direction.

102: angle of horizontal emission of the module D2 towards the rear from the axis 502 with an outwardly lit pattern of at least 55°.

102F: angle of signal to the front and side of the front signal module D1 which, together with 102, emits the turn signal in three directions, i.e., towards the front, the side and the rear.

101: angle of signal towards the front FL with a lit pattern greater than 20° in the horizontal on each side of its focal axis and corresponding to the locating signal of a fixed daytime and nighttime light of the module or cavity D1$b$ the focal axis of which is 501.

103: angle of side signal SL with a lit pattern greater than 15° in the horizontal on each side of its focal axis corresponding to the locating signal from the side with a fixed nighttime light of the module or cavity D1$c$ the focal axis of which 503 is perpendicular to the axis of the vehicle.

2.0.—These signals are classified in two groups, one towards the front-side emitted by the module D1 or by the sub-modules, devices or cavities D1$a$, D1$b$, D1$c$ and another one towards the rear emitted by the module D2, or by the sub-modules, devices or cavities D2, D2G, D2$a$, Li1, Li2, Li3; to which there correspond an set of transparent windows in the front of the rear-view mirror Fw or 1, and an set of transparent windows Rw or 11 for signals emitted towards the rear or the door (see FIGS. 2, 4, 5, 10, 14 to 23).

Said rear-view mirror assembly is divided into three areas or thirds to differentiate its position with respect to the bodywork Car, the first third T1 being considered the closest to said bodywork, and the final third T3 the farthest from the bodywork where the transparent windows Rw or 11 of the modules D2, D2G are normally located in a portion of the structural part which is the perimetric frame Fr and from where the signals are emitted towards the rear (see FIG. 5).

In said rear-view mirror assembly, said first front light module D1 is an integrated multisignal module having independent inner cavities for housing, in addition to a first light device D1$a$ for emitting said turn signal, at least one second light device D1$b$ and/or third light device D1$c$.

2.1.—Therefore in the front multisignal light module D1 in which the light modules D1$a$, D1$b$, D1$c$ are grouped:

D1$a$: is a sub-module, cavity or device for the turn signal towards the front-side.

FL: is a locating signal produced by a light device suitable for emitting a fixed white light locating light signal towards the front (FL) which operates simultaneously with another similar signal emitted from a rear-view mirror assembly arranged on the other side of the vehicle and is visible at eye points located towards the front (Fv), the focal axis (Fb) of which coincides with the front axis 501, parallel to the axis of travel, it takes up the cavity or sub-module D1$b$.

SL: is a fixed yellow-orange colored light side locating signal the focal axis Sb of which, where the light intensity is maximum with respect to the rest of the light emitted, uses at least in this focal center 0.6 candelas, coincides with the side axis 503, perpendicular to the axis of travel, takes up the side cavity or sub-module D1$c$, is emitted together with the rear-view mirror of the other side of the vehicle.

Said signals develop at least one second function for giving an early open door warning when they are interrelated with the activation of the handles of said doors.

For the embodiment in which said multisignal rear-view mirror assembly uses a second light device D1$b$ and/or third light device D1$c$ suitable for emitting said fixed white light locating light signal FL towards the front, the same is suitable for working at two light intensities.

Furthermore, said second light device D1$b$ and/or third light device D1$c$ suitable for emitting the fixed white light locating light signal FL towards the front and/or the fixed yellow light signal SL towards the side uses a controlling circuit which stabilizes the current in each light source by means of digital or analog pulses with a cyclic on and off interval represented by zero and one, with a frequency greater than 20 Hz, such that it is perceived as a light that is switched on continuously for the human eye.

In this last embodiment, said second light device D1$b$ suitable for emitting said fixed white light locating light signal FL towards the front is suitable for emitting said light signal during the day when the vehicle starts and for no longer emitting or reducing its intensity automatically when switching on the general lights L1 of said vehicle.

The signal SL is a locating light for the dark side of the automobile or door area, integrated in other signals of the front module of said rear-view mirror or independent, it uses a yellow light continuously switched on associated with the light of the other side of the vehicle and allows perceiving the vehicle from the side at night and calculating exactly where the door to be located is and perceiving the dimensions of the vehicle on its dark side.

Combined with the front signal FL which emits white light towards the front, they still interact with the stopped vehicle in the event of the door being open, by rotating the position said signal allows knowing the position of said door because the signal which is perceived towards the front becomes the signal that was perceived from the side and is a different color than said first front signal FL.

The angles and direction of emission are: (see FIGS. 2, 4 and 6).

D2: is a multisignal module which emits the turn signal towards the rear, associated with and interconnected to the front module D1, D1a.

For one embodiment, said second light module D2, D2G is also suitable for emitting a second light beam which is a light beam WL consisting of a function independent from that of said second turn signal, but integrated in a cavity of said second signal module, said independent function being a lighting function with any light color on an area Da of the bodywork Car on the door of said vehicle and activated before the driver gets in or out of the vehicle automatically, by means of a remote control, or when opening or closing the door.

For another application, the device D2a produces a welcome light WL and a reversing light RL of any light color, even white light, the focal axis WL of which lights up the door of the vehicle Da and is independent of the module D2 which emits towards the rear, or is independent from the same, it is activated with the vehicle stopped when unlocking, automatically when getting in or out or by the remote control and it is progressively switched off after a time interval or when opening or closing the doors.

The light device D2a or D2G produces functions:

Li1: is an indicator light to mark and locate, indicate, warning, focus and focus spotter mirror image of G2, and operates in response to a sensor system peripheral or vehicle intercom systems detecting an approaching vehicle, in response of an action of the driver, or in response to a turning maneuver without turning signalization; it has a light source different from the turn signal, and emits light of any color visible to the driver of the vehicle; for an application version is integrated into the interface signal D2 and backward rotation is independent but related to the same module;

Li2: is an indicator light to mark and locate, indicate, warning, prevention image focus and center of G2 spotter mirror, works in sync with the turn signal of the vehicle and its beams are oriented at least partly into the eyes of Dv driver, and has an optical means such that said oiN indicator light is diffuse and does not bother the driver's eyes;

Li3: corresponding to a second or third light output of the device Li2, when the optical output 11 extends along various parts of the perimeter of the spotter mirror G2; and RL or reversing light, emitting a beam of light of any color, short sea and back and down BD, to an area near the rear wheel RW, on the side of the vehicle, said light beam back and down BD will never directed or directly or indirectly upset the driver's eyes Dv.

Reversing light RL is actuated at unison with the reversing light of the back of said vehicle, and is interconnected thereto by a cable or radio frequency device acting on its corresponding controller functions.

Li2 indicator light is also located in the subassembly mirror especially when the set consists of two mirrors separated, usually by a step St that can vary the orientation to have two continuous images one main G1 and one auxiliary spotter mirror G2, and preferably in the perimeter of the spotter mirror G2, its function is to help focus and G2 locate the spotter mirror when a peripheral detection system detects the presence of the vehicle from a vehicle or object can function also associated with a buzzer is actuated or when the system of the door opening.

Figure 1:
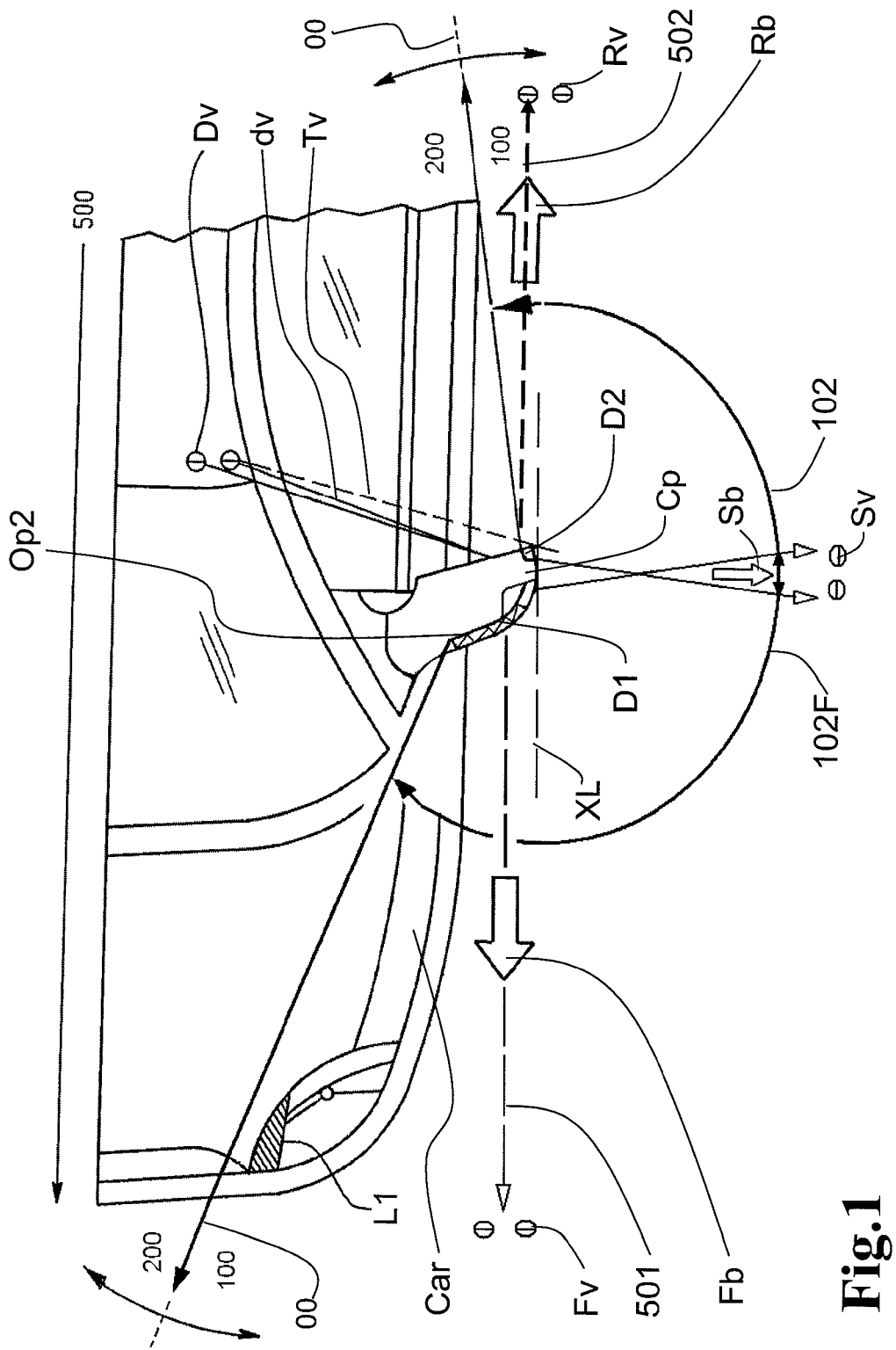
FIG. 1 is a top fragmentary view of a fourth of a schematic vehicle with indication of light modules or signal modules D1, D2 included in the rear-view mirror of the invention and corresponding patterns of light.
Figure 2:
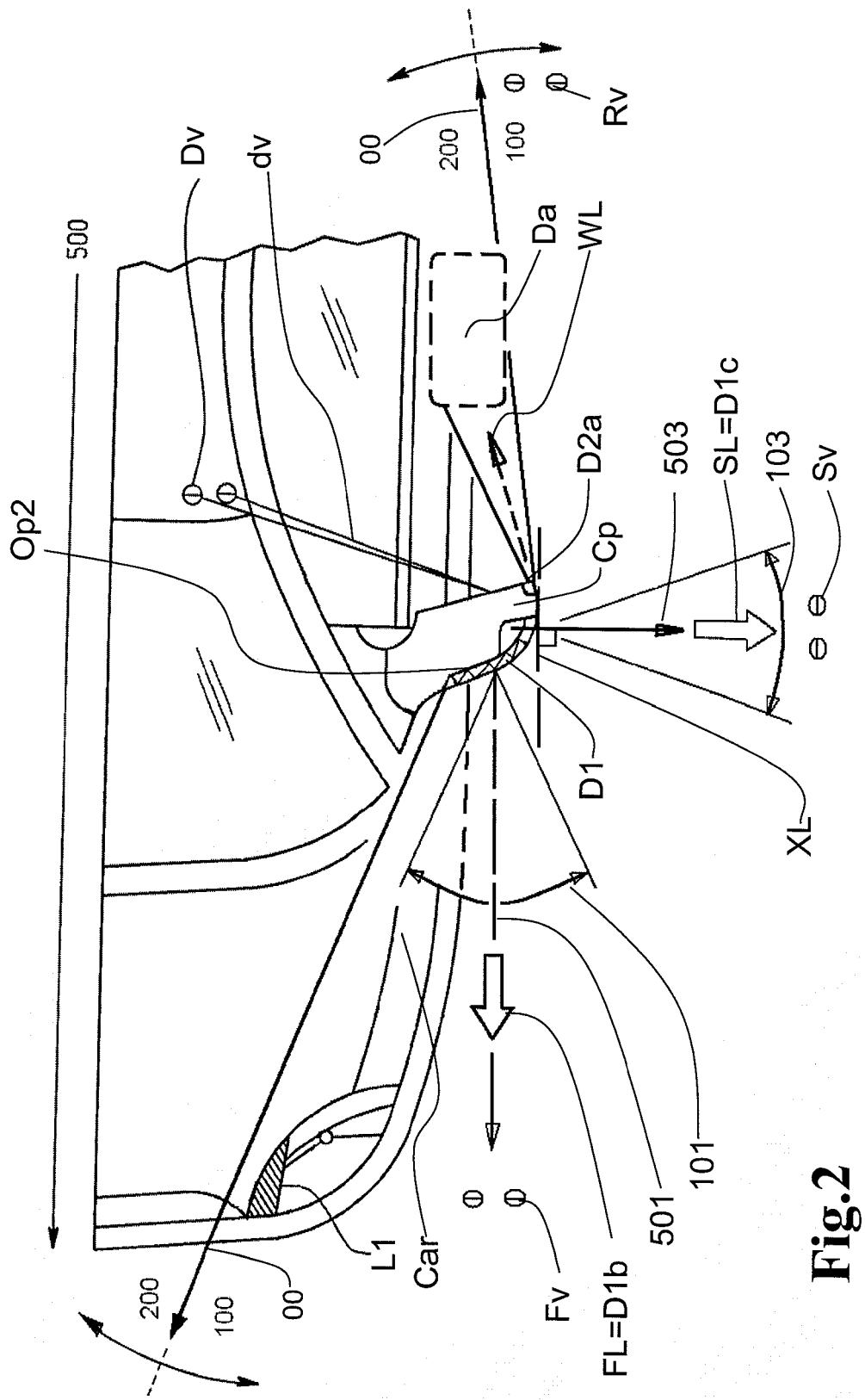

The emission of light from these devices Li1, Li2, Li3 demarcation, indication, warning, targeting and focusing the attention of the drive towards image of the spotter mirror G2, is made from separate area 200 outside the emission pattern of outward signs of greater intensity 100, and is aimed at the driver's eyes Dv, FIGS. 1 and 2, to cause no flash.

At least part of the light output of these devices Li1, Li2, Li3 demarcation, indication, warning, focalization and centered the mirror image of that spotter G2 are located next to the frame Fr mirror body assembly or a step St, and therefore are protected or shielded from the incidence of external light Ob1, in a shade area 18, 18a, 18b to be visible during the day for the driver.

Devices Li1, Li2, Li3 demarcation, indication, warning, focalization and centered on the image of the mirror spotter G2, have a dimmer control circuit 21 in its electronic interface that varies eiN or decrease the intensity of light emitted at night.

Reference will be done here to FIGS. 8 to 21 detailing several embodiments that differ from arrangement or location of indicator lights Li1, Li2.

FIG. 8 shows the electronic interface eiN formed by a PCB circuit 20, a protection or dimmer circuit 21 and a LEDs 30 as a light source placed under the spotter mirror G2.

The optical interface oiN comprises an optical body for guiding, spreading, and control light reflecting represented by the beams 32, including among others internal reflection prisms Mpr, internal transparent body 4, optical input coupling 6 and outlet perimeter 11 for the indicator light Li2. These means can vary according to the function, lighting mirror location Li1, Li2 and auxiliary lighting device D2a, reversing light RL, and WL welcome light. Protective shadow 18a with regard to incident external light Ob1 produced by the step St is shown in this Fig.

FIG. 9 shows the oiN optical interface comprising optical elements guiding the two indicator lights Li1, Li2 demarcating the image reflected on the surface S2 of said spotter mirror G2. Protective shadow 18a created by incident external light Ob1 by the step St, and depression Re to output light 11 are also indicated.

Figure 10:
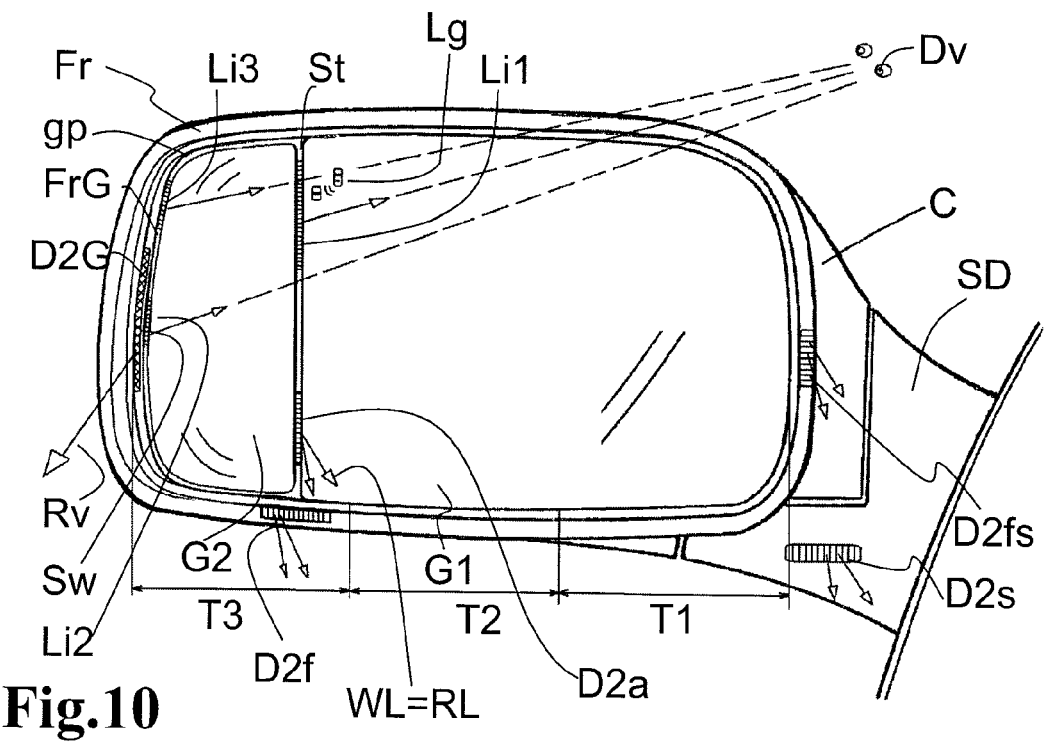
FIG. 10 is an elevation view of rear-view mirror of the invention showing the two glass plates or mirrors G1 and G2 and associated indicator lights.

FIG. 10 shows the mirror subassembly formed of two independents parts G1 and G2, where G1 is the main reflector mirror and G2 is a spotter mirror or reflector auxiliary preferably located in the third T3 of the mirror assembly (FIG. 3) showing the location of the turn signal module D2G emitted towards the rear that is assembled in the rim or frame of the spotter mirror G2 holding plate FrG. A gap gp indicates a separation of the mirror with regard to the frame Fr Turn signal light D2G also produces Li2 demarcation on the edge of said spotter G2 (using same light source. The demarcation light Li1 from a different light source has light output in step St and is activated in response to a vehicle external sensor.

In this embodiment a second light output Li3 located at the outer edge of said plate glass PG is activated by another peripheral sensor. This Fig. also shows light device D2a emitting a beam of light WL towards door or a reversing light RL from the step St inter mirrors G1 and G2. In an alternative embodiment light device D2a is independent, and is fixed to the lower frame as D2f or in the frame side D2fs or on the support to the vehicle SD, as D2s device.

Figure 11:
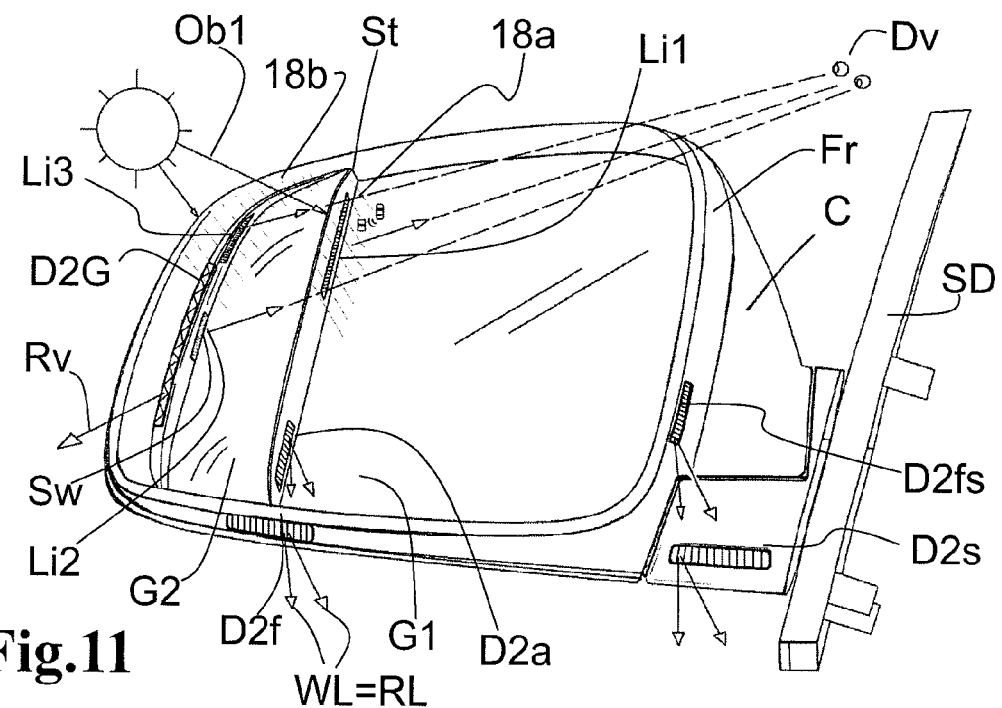
FIG. 11 is a perspective of rear-view mirror of FIG. 10.

In FIG. 11 shadow 18a and 18b of protection of indicator lights Li1, Li2 and Li3 against the external incident light, in particular sunlight Ob1 is shown. This protection assists to improve vision of said indicator lights and is obtained by the step St and the frame Fr of the housing. A logo Lg appears near the spotter mirror indicating the performances of this rear mirror.

Figure 12:
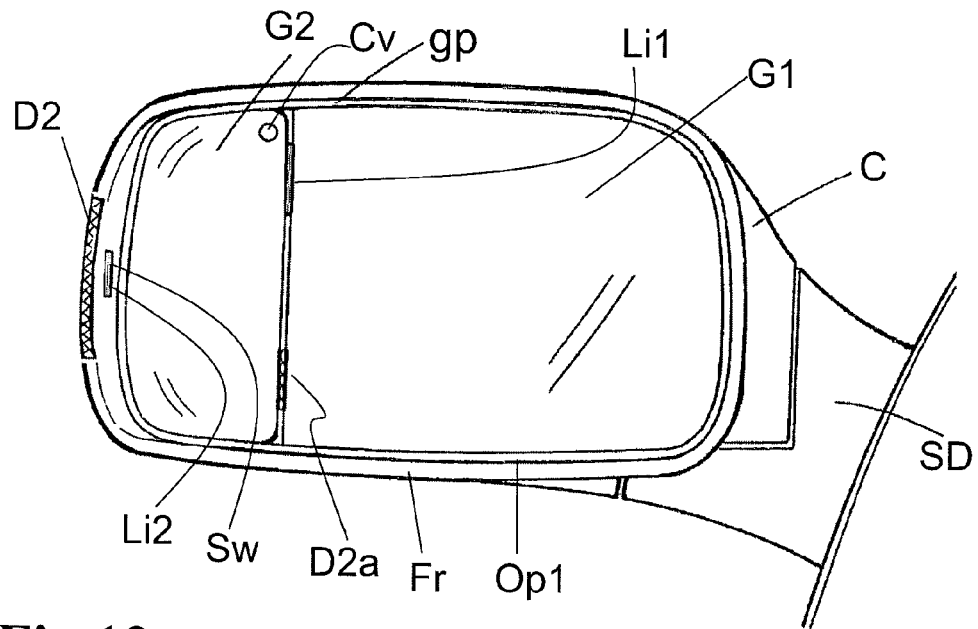
FIG. 12 is an elevation view of an embodiment of the rear-view mirror of this invention with another location of light module D2 and FIG. 13 is a perspective view of this embodiment.

FIG. 12 is a rear elevation view similar to FIG. 10, but in this example, the turn signal module D2 is set in the outer frame Fr of the mirror housing or casing C, the gap gp separating said frame Fr from the assembly G1, G2, and the indicator light Li2 associated to the turn signal outputs through a small window Sw in this framework.

Figure 13:
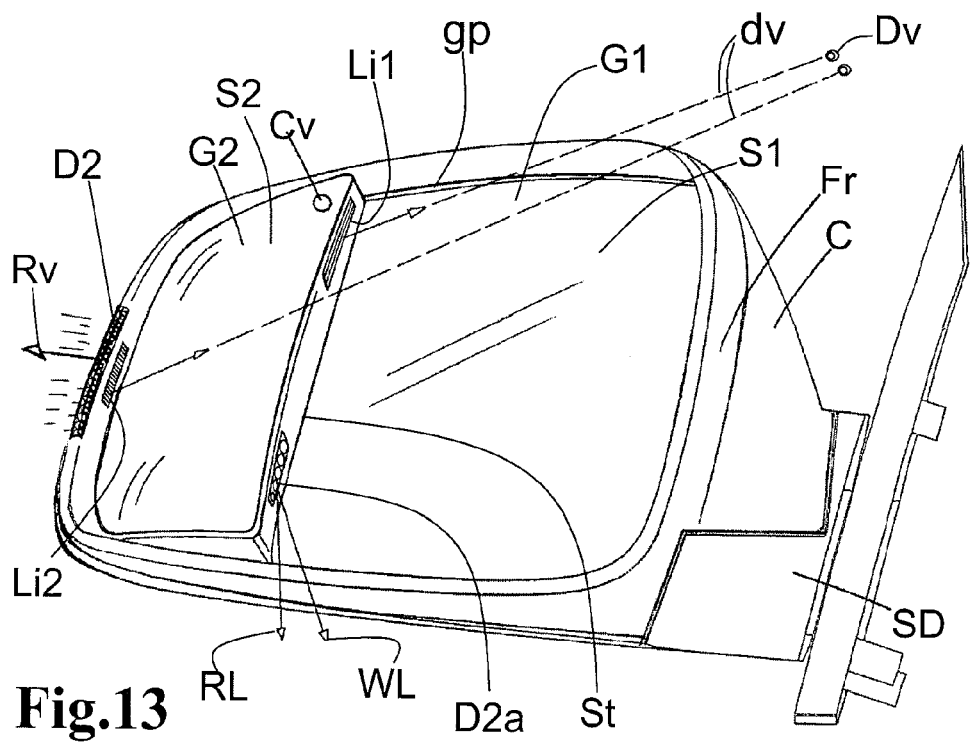

In FIG. 13 lines of projection beams dv of said indicator lights Li1 and Li2 directed to the driver's eyes Dv have been indicated, while light beams from light module D2 located in the body frame Fr of C of the mirror assembly are oriented towards a rear side of the vehicle, i.e. the points of view Rv placed back on a rail adjacent to the vehicle and to the back thereof.

FIG. 14 shows the mirror assembly comprising two parts: main mirror G1 and spotter mirror G2. Said mirrors G1, G2 are separate and independent bodies, with separate external reflection surfaces S1 and S2 mutually independent through a separation or partition step St preferably of opaque material separating mirror surfaces S1 and S2 the second one with inclination angle and a curvature that allows seeing a field of vision expanded. Spotter mirror G2 adjacent its perimeter two indicator lights Li1 and Li2 of different colors responding to different functions and helping in locate and demarcate G2 spotter mirror, focusing the attention of the driver toward image between these two indicator lights Li1 and Li2:

Light Li1 is on the outside perimeter of G2, remote from the vehicle and operates in response to a detector sensor system activated by a vehicle approaching or advancing the one equipped with this rear-view mirror or as a consequence of a turning maneuver of the vehicle at any speed without signalization;

light, Li2, is preferably located on the side closer to said vehicle body G2 spotter mirror, operates in coordination with turn signal from signal modules D1, D2; and n In the perspective view of FIG. 15 separation or step St between the mirrors G1 and G2 includes light output 11 in a recess Re of the step St wall visible by driver's eyes Dv and protected against external light as previously disclosed.

Figure 16:
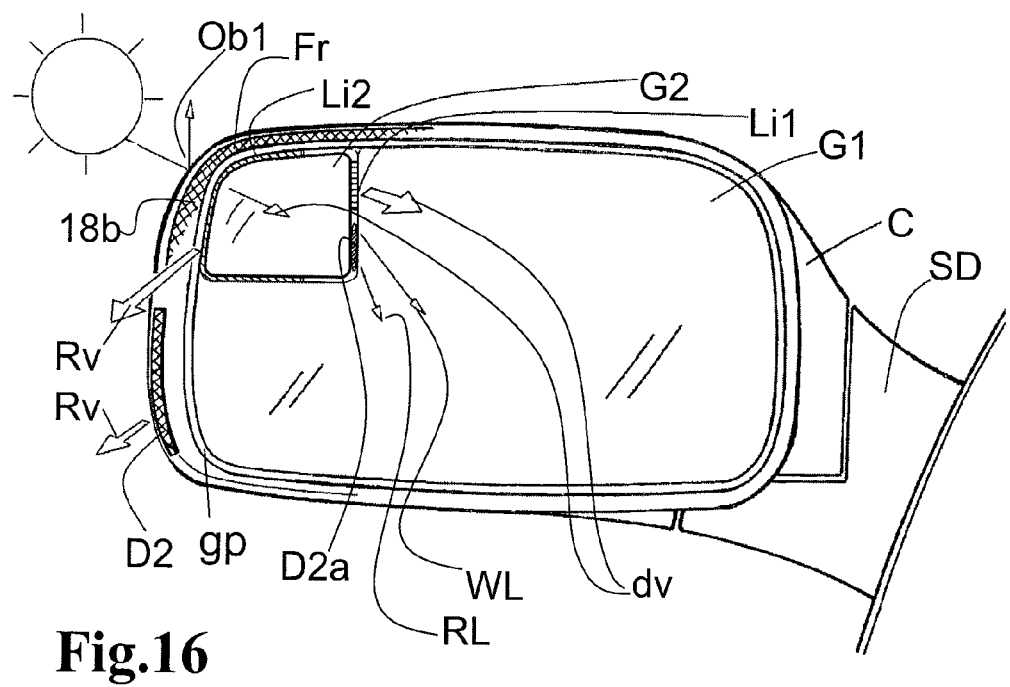
FIG. 16 is an elevation view of an embodiment of the rear-view mirror of this invention with main G1 and spotter mirror G2 constituted by independent bodies and FIG. 17 is a perspective view of this embodiment showing another arrangement of light indicators placed at the step between the two mirrors G1 and G2 and adjacent to another perimeter zone of spotter mirror G2.
Figure 17:
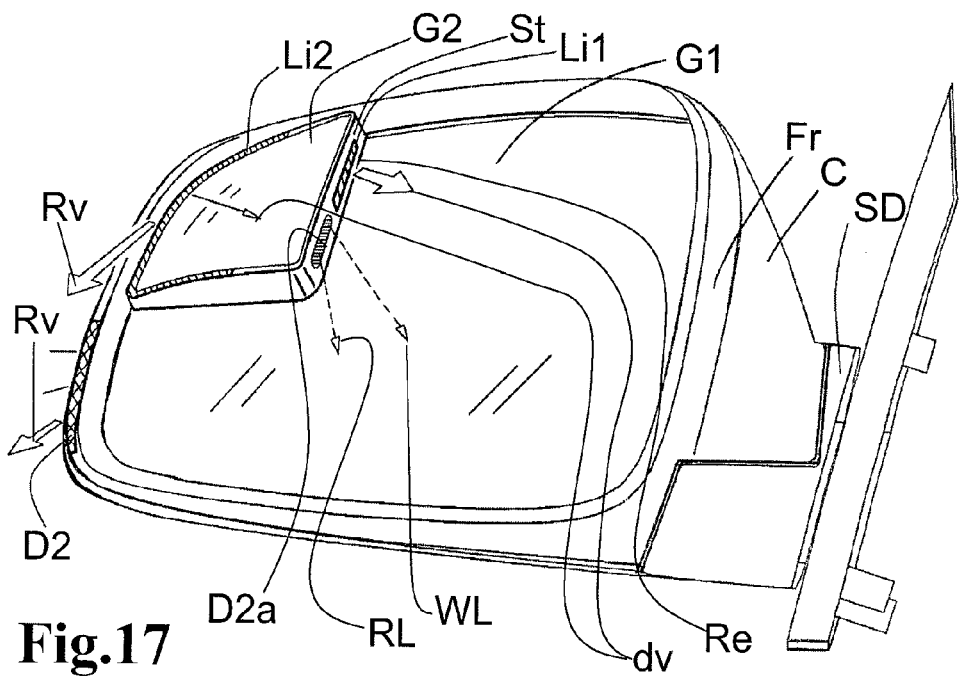

The embodiment of FIGS. 16 and 17 is similar to the one of FIG. 14 but, the light device D2a that produces welcome light WL and reverse light RL is located in the step St or in a gap located between the two mirrors G1 and G2. FIG. 17

Figure 18:
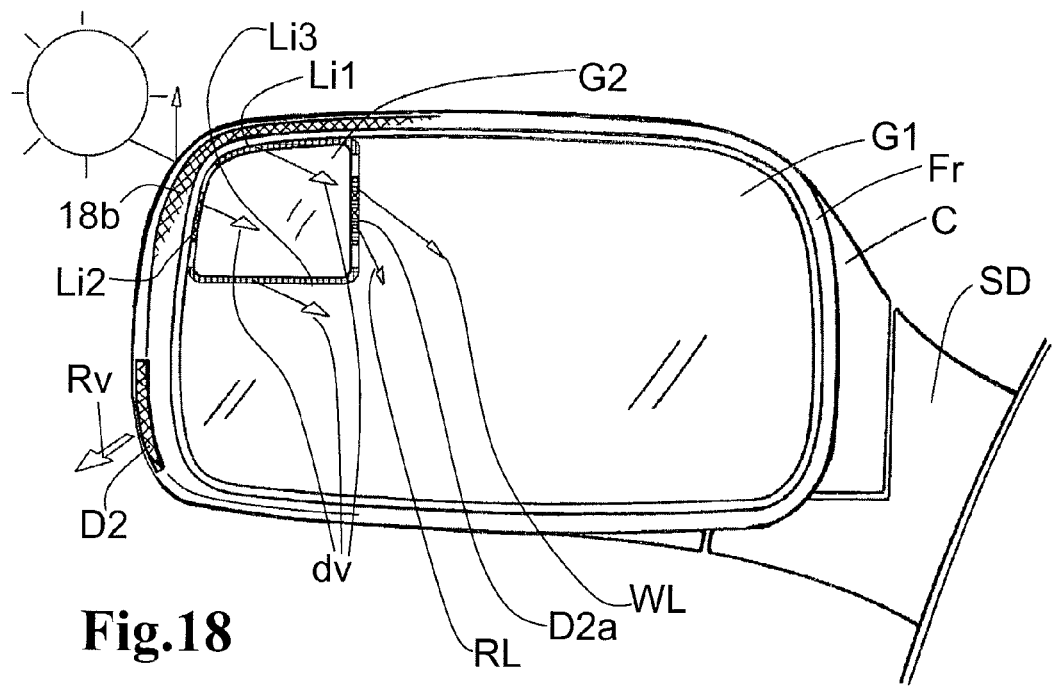
Figure 19:
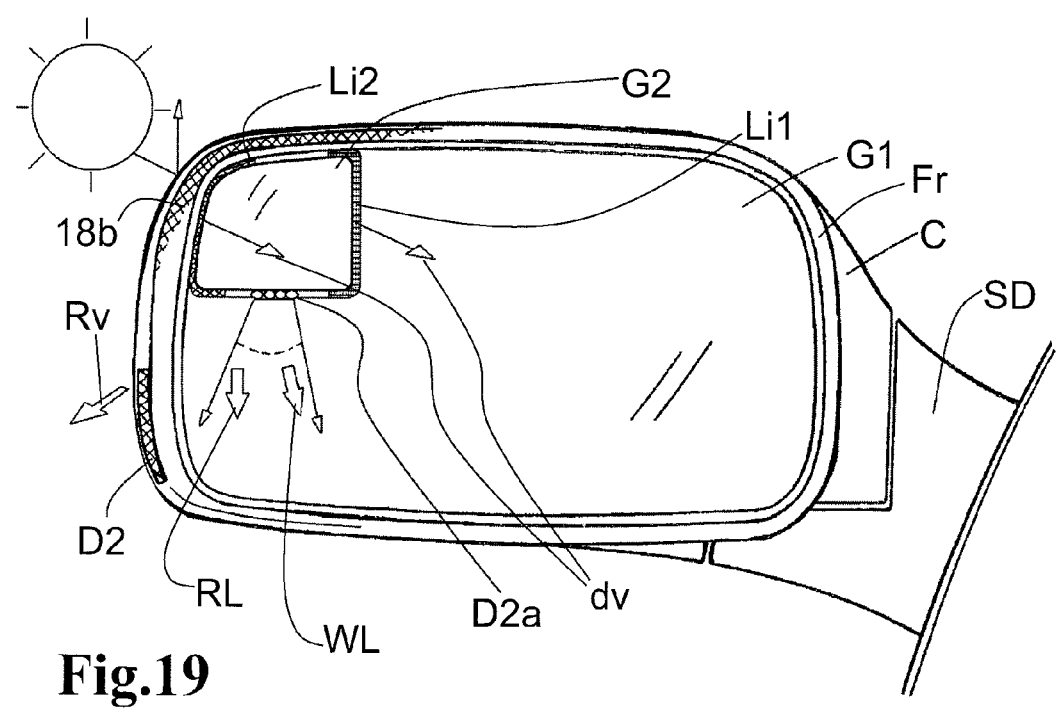
FIG. 19 is an elevation view of an embodiment of the rear-view mirror of this invention with another arrangement of light indicators and light modules.

The embodiment of FIGS. 18 and 19 is a mirror assembly similar to the one of FIG. 16, in which light indicator Li2, which works with the turn light occupies a small portion of the perimeter of said spotter mirror G2, near the outer frame Fr and light indicator Li1 activated in response to a presence sensor system, opening of a door or turning maneuver of the vehicle not signalized and at any speed, occupies two parts of said perimeter, identified Li1, and Li3 that in this example are in opposite points to center the image of spotter mirror G2 between them when activated.

To notice that light device D2a provides also light beams, issuing from the perimeter of G2, in response to the reverse gear RL and/or auxiliary beams of light WL that illuminates as a welcome the door of said vehicle.

Figure 20:
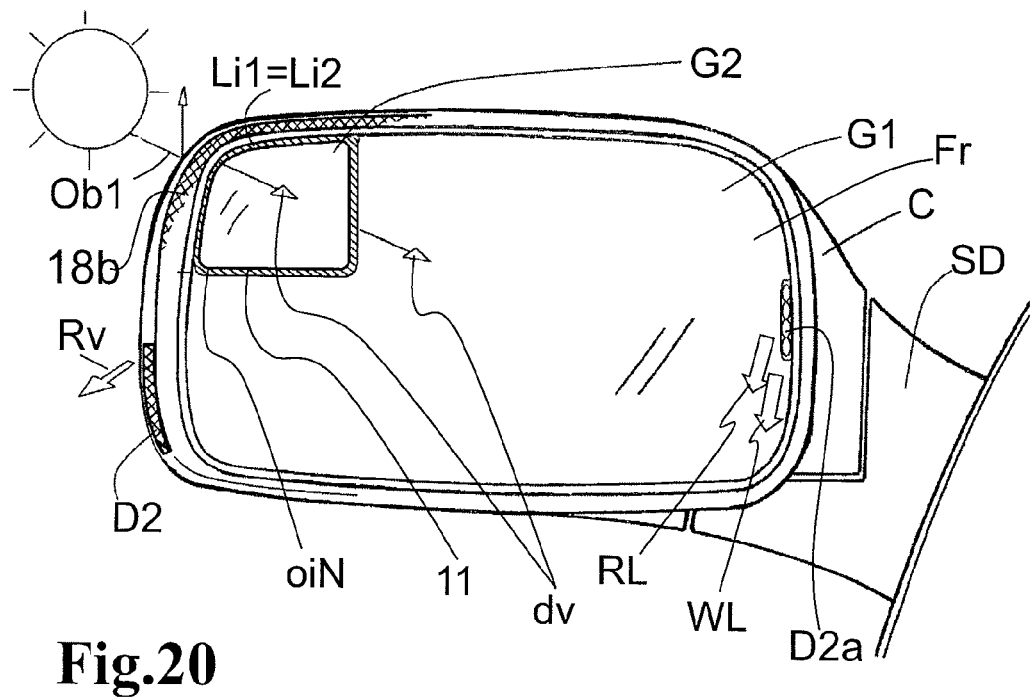
FIG. 20 is an elevation view of an embodiment of the rear-view mirror of this invention with main G1 and spotter mirror G2 constituted by independent bodies and FIG. 21 is a perspective view of this embodiment showing another arrangement of light indicators placed at the step between the two mirrors G1 and G2 and adjacent to another perimeter zone of spotter mirror G2.
Figure 21:
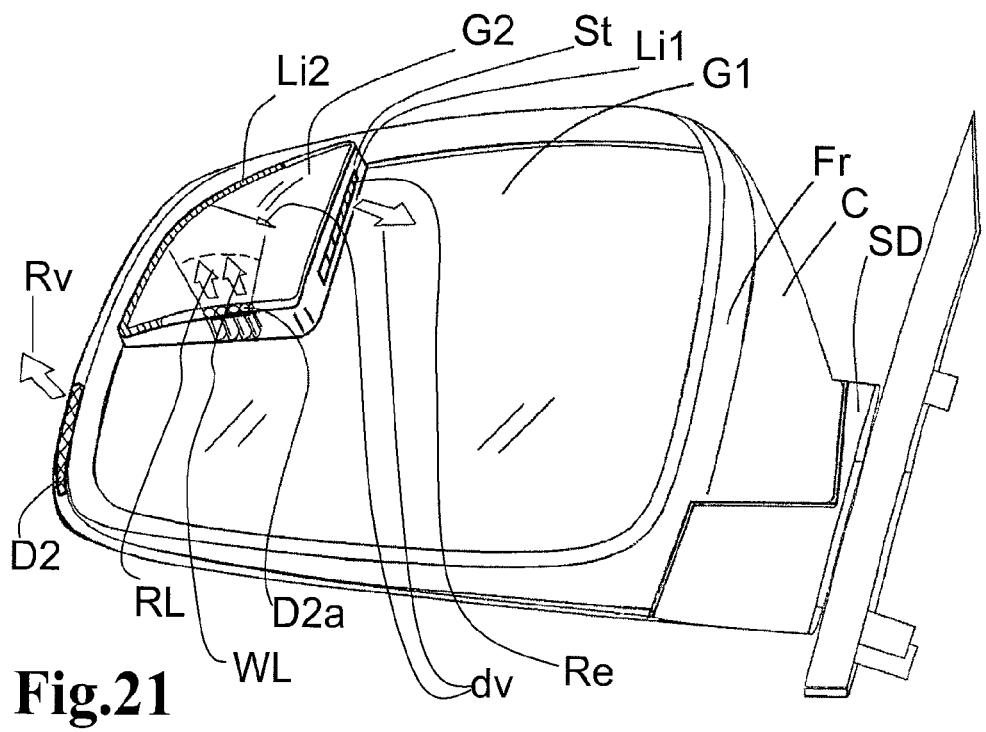

Embodiments of FIGS. 20 and 21 show a mirror assembly similar to the one of FIG. 18 but in this case indicator light devices Li1 and Li2 employ the same optical interface oiN the outlet 11 of the light changing of color according to the function and being associated to a light source of two colors. In FIG. 21 step St is visible providing a protection of Li2 as previously described.

In FIG. 20 light module D2a is placed in the perimeter of the main mirror G1 (producing beam light WL and RL). In FIG. 21 light module D2a is placed in the vicinity of spotter mirror G2.

For one application, said cavities of the front module are modules separated from one another D1a, D1b, and D1c. These signal modules separated and independent from one another or associated in pairs, for example D1a+D1b or D1a+D1c, D1b+D1c, can in turn have a configuration for their outer transparent cover 1 which is partly concealed by the casing cover C, Cc, it thus comprises a plurality of openings W1, W2, W3, W4 . . . Wn defined in said outer wall of said casing of said rear-view mirror assembly, located in said area opposite said main plate glass G1, and because after each opening of said plurality of openings there is arranged at least one of said cavities, each of said openings W1, W2, W3, W4 . . . Wn being closed by an outer transparent or translucent cover 1 and it is possible to apply this configuration for one and the same function or for each function.

For one embodiment, in said multisignal modules D1, D2, D2G, D2a, Li1, Li2, Li3 the transparent cover is unified or extends behind a structural part of the casing or the frame which does not transmit light, at least one of said transparent or translucent covers 1, 11 is integrated in the casing C, Cc of the rear-view mirror assembly, or in said structural part forming a perimetric frame Fr or in a portion thereof, or in said adjacent part of the rear-view mirror assembly, through a bi-material injection process, it can thus have more than one light outlet window for one and the same type of signal; said bi-material injection process and is a consequence of sharing a mold, where one material is the transparent material, in said case of bi-material injection the opaque part or casing C, Cc is not painted.

For another embodiment, if said transparent cover 1 which is W1, W2, W3, W4, or the outer transparent cover of the second module D2 which is 11 is assembled or if one part is integrated in the other, which is the casing cover C, Cc, mechanically by assembly, the opaque part, casing or cover C, Cc or the frame Fr, can be painted (see FIGS. 4, 5).

When said multiple windows are small forms, they have a crown-type extension of the transparent cover 1c towards the inside for the purpose of preventing the leaking out of light through its inner sides. FIGS. 4 and 5.

For another embodiment, said structural opaque part surrounding the transparent windows of said signal modules or devices can be painted or can have a surface treatment, such as for example anodizing if they are of aluminum or an overlay adhered and varnished, as a decorative cover (see FIGS. 4 and 5).

3.0. —Protection with structural parts of the signal modules against blows.

The second module D2 associated with and interconnected to the first module D1 is an independent multisignal module which performs at least the turn signal but towards the rear, it is integrated, housed, inserted in or abutting with the perimetric frame Fr of said rear-view mirror, normally without projecting therefrom and its electro-optical interface eiN is concealed by a structural opaque part of the casing cover C, Cc referred to as protective cover Cp which normally takes up the third or area T3 farthest from the bodywork and comprises at least one of the following structural elements, or a combination thereof or other structural parts, at least one casing cover C and one or more half-casings Cc, or a part of the inner supporting body of said module 10, or of its reflector 12.

Said opaque part is interpolated between the first module D1 and said second module D2 separating them.

For one embodiment, the second opening Op2 extends towards the rear until intersecting with the structural frame Fr, thus establishing contact between the transparent surfaces 1, 11 of said first and second light modules D1, D2, said modules are then arranged one after the other, establishing contact at least between their outer transparent or translucent covers 1, 11, or between any of their inner parts 12, 10 and any of said outer transparent covers 1, 11 which are located one after the other, in this case said opaque part Cp concealed by part of the interface eiN is part of one of the signal modules and is immediately under the transparent surface.

Interaction of the Locating Signals:

Said outer covers, parts of the casing or half-casings or additional covers C, Cc are ex professo suitable for receiving tangential blows in their extreme area XL on the side far from the bodywork of the vehicle Cp, therefore their composition is in a material suitable for receiving blows such as fibers, plastics with additives, elastomers or metal, especially of the treated or anodized aluminum type (see FIGS. 3, 4, 5).

3.1. —Protection against the incidence of outdoor light during the day (Contrast).

Said protective cover for protection against blows Cp also protects the interface eiN of the emitters or reflectors of the second signal emission module D2 from the incidence of the beams of outdoor light during the day producing an area which does not emit light nl which in turn improves the perception of light towards the rear or to the eyes of the driver in the case of operating indicator lights, because it products greater light-shadow contrast.

For one embodiment, the signals continuously switched on during the day, especially the front signal FL used the front module D1 in its cavity D1b or as independent module D1b makes use of another part of the same front module consisting of a part of the inner interface, part of the reflector 12 or of the inner supporting body 10 prolonging above the reflector until forming a reflective-absorbing surface Rx for reflecting-absorbing the incident outdoor light Ob1 almost parallel to the corresponding outer transparent cover 1, the reflection of this outdoor light produces reflected beams of said outdoor light Ob2 which in turn produces under itself a shadow area 18 on the interface eiN generating the light of the signal along its optical axis Fb or front beam, so better perception of the light emitted during the day with respect to the environmental light is perceived. As a feature, a lit vertical angle a is perceived, formed between the first incident outdoor light beam and the beam of front emission which is in front of said shadow area 18 projected on the emission interface of said signal (see FIG. 6).

This technique of improving the contrast applies to the other signals of the front module, such as the turn light signal or those of fixed use at night.

As previously indicated at least part of the light output 11 of these devices Li1, Li2, Li3 demarcation, indication, warning, focalization and centered the mirror image of that spotter G2 or area of greatest curvature for aspheric mirror, are located next to the frame Fr mirror body assembly or a step St, preferably in that step is a depression or recess Re, and are protected from the incidence of external light Ob1 a shade area 18, 18*a*, 18*b* to be visible during the day.

3.2. —Protection against overheating. Cooling.

For another embodiment, the first light module or front module D1 has locating signals continuously switched on, for example an independent module D1*b* producing the front locating signal FL or D1*c* producing the side locating signal SL and the associated sub-module D2*a* of the welcome light WL/reverse light RL using an associated cavity located in the second module D2 or it is an independent module (preferably located at the G1-G2 subset mirrors or aspheric mirror single), and lights up the door in an area Da for a prolonged time period, normally controlled by a dimmer or timer for the progressive switching on and off.

Functions of this type continuously switched on have a particular treatment of the temperature generated by the LEDs, they develop a thermocouple, with an interface designed for the chain transmission from one material to the other, of the heat of the LEDs of any type and of their protective circuit 21 and supporting circuit 20 even being of metal, using thermal paths 22 between its printed faces 20*a* and 20*b* until removing it from the enclosure which houses them, or supporting body 10, and it consists of associating an inner radiator cover R with flaps aR or hollow cooling tubes, which is made of a heat conducting material; composite plastic, or metal, copper, aluminum, or the like, with anti-corrosion process, with a sealing gasket secured to the body of said cavity by screws or clips.

In order to maintain the heat transmission chain by proximity of the parts and ventilation, the signal modules or devices preferably have a protective circuit 21 which usually has resistors or a microchip for controlling and stabilizing the current which is separated from the circuit of said light source 20, or located outside the module D2, D2G, Li1, Li2, Li3 or in another module, or directly in said PCB 20.

The circuit 21 also acts as dimmer for the light intensity emitted to the eyes of the driver Dv in the night.

Said light source is integrated by simple or multi-chip LEDs, or the chip on board type, associated with said cover R which in turn interacts with at least one or several ventilation holes for circulating the hot air which preferably enters at a lower level and circulates upwards by heating or convection, which produces a renewal thereof and cooling of the signal module. Said holes can have a membrane or reed valve to prevent outside dust, moisture or condensation, and they are designed to prevent water from falling therein. Said holes can be associated with an air inlet on the outer cover or any of the casing covers.

4.0. —Locaters, operating indicators, acoustics and sensors, (see FIGS. 2, 4, 7, 8, 9, 10, 12, 13, and 14 to 28).

These elements are associated with outer signals, their function is to indicate, step-by-step, the operating state of said signals or they are a complement of different actions in the process of opening the door when passengers get in and out, or they are a complement of peripheral detection or intercommunication systems, radars, cameras, laser scanners, and are:

Sw: (sometimes coincides with Li1) is a Optical light outlet by means of a small window located in the frame casing Fr or in the part comprising an opaque partition Fri at the height of said recess 19, 29, 39 visible to the eye points of the driver Dv, producing an operating test for said turn signal, derived from said second signal module from the rear D2, ex professo visible to the eyes of the driver Dv, it consists of a transparent light guide type member part 8, 28, attached and associated with the optical body 4, or with the electro-optical interface eiN of said signal D2, D2G, or it is part of said optical body 4, has prisms and inner reflective surfaces and traverses said structural opaque part Fri for the purpose of conducting the light to said light outlet surface Sw which is engraved or has microgrooves for attenuating the light and producing a diffuse reflection in the direction of the eyes of the driver Dv. Due to its location, it serves for locating the mirror plate glass G1 upon activating the signal. It also projects part of the light which it emits as a signal towards the rear visible to the rear eye points Rv as a complement of the blinking signal emission towards the rear of said vehicle. FIGS. 3 to 28.

Li1: Is an optical outlet variant for another embodiment, said small window Sw, which emits the operating indicator light for the blinking signal, is an inlet Swe with the form of a side extension of the opening containing the transparent surface 11 of said second light emission module towards the rear.

Li1: Independent or alternative indicator light, it is an optical member on a step or unevenness St formed between said two plate glasses of the plate glass mirror assembly, formed by a member 28 of said optical body 4 or it consists of at least one LED of any color, located in any part of the bodywork, frame of inner door or rear-view mirror acting in association with the signals A and it is visible from the point of view of the driver of the vehicle 202.

Li2, Li3 is an operating indicator light sub-module for peripheral detection or intercommunication systems or sensors of the vehicle, it has a light source different from that of the turn signal and emits light through a beam dv of any color visible to the eye points Dv corresponding to the driver of the vehicle, it is integrated in the same module and interface or circuit of the signal module towards the rear D2 or it is independent but associated therewith.

So is the outer acoustic signal for improving the warning to the environment, in some applications said operating indicator lights are complemented with acoustic operating indicators, especially in pedestrian areas, in stops or when passengers are getting in and out, said acoustic signal So is under the complementary plate glass G2, it is an element forming part of the circuit of the second signal module or the first signal module.

For another embodiment, the second device D2, or D2G incorporates a temperature sensor T in its interface (see FIG. 7).

4.1.—Cameras, intrusion detectors, sensors. (see FIG. 4, 5, 7, 12, 13)

The electronic interface eiN or circuits of said associated modules allow integrating intrusion sensors based on video cameras Cv which are oriented towards the rear or the front of the vehicle, and are associated with continuous operating lights such as the front light FL, they have the focal vision towards the front and downwards, said emission and camera can be infrared and in all cases the light-camera association is for facilitating the operation of the latter and for seeing what is happening in the front wheel of the side opposite the driver or the discontinuous line of the road lane. Said cameras are associated with a programmed controller which analyzes the images or with a display for aiding in decision-making.

For another embodiment, said camera Cv is oriented towards the rear, located under the main plate glass G1, or a secondary or abutting plate glass G2, or a portion of the perimetric frame FR, or a perimeter to spotter mirror G2; and it shares the electronic interface of the module which emits signals towards the rear D2 or D2G, the plate glass is treated by a laser process which leaves the glass on which the metal coating is deposited free and transparent, thus facilitating the location of a camera under said side mirror For another embodiment, the second module D2, D2G, Li1, Li2, D2a incorporates a temperature sensor T in its interface (see FIG. 7).

For one embodiment, said second module D2, D2G, Li1, Li2, D2a, has in its electro-optical interface eiN a complex optical transparent solid body 4 made up of at least three phases:

1—A light inlet phase with an optical device 6; or with a prismatic micromirror 7.

2—A phase of movement of said optical body 4 for inner reflection and homogenization and of the light 9 emitted by the LED 30.

3—An outer optical light outlet surface 11, which is smooth, engraved or with the optical design necessary for the re-direction of the signal towards the rear Rv, and covering the angle of the signal towards the rear 102 FIGS. 1 and 4, maintaining a general outer shape similar to the rest of the frame Fr of said rear-view mirror and it is settled and inserted therein.

This second module D2, D2G, Li1, Li2, D2a, has a printed circuit PCB 20 with at least one LED 30 which is located under said casing cover C, Cc which may not have in the same circuit the protective electronic components 21 in order to reduce volume, which are located for this case in the first signal module D1 associated and interconnected by the interconnection cables iC, and it has a supporting body 10 welded or bonded to said optical body 4, protecting the circuit and serving to secure the means for fixing and assembling at least one structural part of said rear-view mirror by clips, teeth or screws 5, 15.

The light inlet or coupling 6 of said complex optical body 4 has a central emission beam Rb of said LED 30 which is parallel to the axis of travel 500 but towards the rear 502 (see FIG. 1). In this case the body 4 has a flat light coupling or an optical control device 6.

In another embodiment, in order to reduce volume the LED 30 uses in the coupling an inclined reflective surface or prismatic micromirror 7 for the light inlet and coupling, close to said LED 30 with an angle of 45° with respect to its main beam; this prismatic mirror 7 reflects said beam towards the direction Rb and homogenizes the light in its reflection such that when seen from Rv, the points of light are not distinguished as separate LEDs in the event of being more than one.

The reflective surfaces 9 belong to one and the same part with a vacuum metal coating process, or they consist of a cover, or it is painted with a reflective material applied on the same complex optical body 4.

Said second module between the components of its phases of the complex optical body 4, the light source and the outer transparent surface 11 forms the:

Electro-optical interface eiN formed by the optical devices 6 or prisms 7 of inlet or coupling of the light to the body 4 and the light source, its LEDs 30 and supporting circuits 20.

Optical interface oiN formed by the outer decoupling or light outlet surfaces 11, the inner reflectors 9 and the optical body 4.

Thermal interface tiN formed by components defining a cooling system for the light source.

Said complex optical body 4 has a side member 8 which optically deflects part of the signal light that is visible in an attenuated manner to the driver Dv. Its function is to act as an operating indicator of said turn signal, and as a locater of the rim of the plate glass and it aids when looking towards the rear when activating said system as an early open door warning.

In the surface of said light outlet Sw, Swe, Li1, Li2 or in its course, it has an engraving, a diffuse reflective surface or vertical microgrooves which attenuate the light in direction dv towards the view of the driver Dv, part of this light can be seen from the rear by the eye points Rv and the signal can be partly increased while at the same time continuing to carry out the test function by the driver of said vehicle.

The frame Fr in this area conceals the outlet of the signal 11 at least partly such that the eye points of the driver have a tangential vision Tv of said signal outlet from the rear or they directly do not see it, such that it does not cause any discomfort to look at the plate glass G1 since the focal axis of emission of the signal is towards the rear Rb, towards the points Rv. FIGS. 1 to 12.

For another embodiment, said second module D2 or its electro-optical interface eiN is located under the plate glass G1 or G2 when there is more than one plate glass in the plate glass holding plate assembly PG, with a light outlet visible from the rear Rv located in the outer part of the perimeter of said plate glass holding plate which supports it PG and between said mirror G, or G2 and the frame of the casing Fr, forming the plate glass-signal assembly D2G FIGS. 7, 10, 11 and 23 Said signal module D2G is independent and has slight movement in accordance with the plate glass which holds it with respect to the module D1 fixed to the casing and has an allowance or gap with the frame Fr of said casing.

For one embodiment, D2G comprises a complex optical transparent solid body 4 for distributing the light towards the rear according to the focal axis Rv, its optical interface is divided into 4 technical phases:

1—Inlet phase of the light by means of the inclined prismatic micromirrors 7, conical mirrors 7c, or associated optical devices 6 which in the plane P distribute and homogenize the light beams 32 in a decentralized manner from each emitter 30. Said conical mirrors 7c can be replaced with optical coupling devices 6 such as that of the blinking signal of the second module D2, in this case the circuit 20 and its LEDs are perpendicular to the beam 32 moving across said optical body 4.

2—Phase of the distribution and homogenization plane P of the light 32. Located under the plate glass G or G2 and parallel thereto, it directs the incoming light beams 32 towards an inner prismatic mirror with a light outlet Mpr.

3—Prismatic mirror Mpr is inclined approximately 45° with respect to the distribution and homogenization plane of the light 32, it is smooth, engraved or made up of small reflective facets which redirect the light towards the rear Rv by means of the beams Rb.

4—Outer optical light outlet surface 11, with a smooth surface, engraved surface or with the optical design necessary for redirecting said light towards the rear Rv and for covering the angle 102 (see FIGS. 5 (A-A), 23 (A-A), 7), with a short course for the light reflected inside said body.

Said complex optical body, at least in the homogenization and reflection phases 2 and 3 of the light, is covered with a reflective surface of a light color, or metal-coated under vacuum, or with reflective paint 9 still applied directly on said body 4, except in the light inlet and outlet parts.

Said signal device D2G has LED emitters 30 on a PCB circuit 20 which can have a protective circuit 21 or said protective circuit can be in the part of the associated front signal emitted by D1 as a novel anti-theft measure of said plate glass-signal assembly. Without that protective circuit D2G does not work.

The entire plate glasses-signal assembly is supported by the plate glass holding structure PG which is in turn secured to the actuator Ac by clips. The rim FrG of said structure PG conceals from the eyes of the driver Dv at least part of the light outlet surface 11 of said signal D2G which have a line of vision Tv tangential to said surface 11, do not see said signal outlet area and are not in the line of the focal axis of emission of signal towards the rear Rv.

Said structure subassembly PG in its rim farthest from the bodywork FrG, which is directly visible to the eyes of the driver Dv, conceals the outlet of the signal 11 on one side, on the opposite side it has a small window with attenuated light outlet Li2, directed to the driver Dv as an operating indicator light for said signal or locater of the plate glass and is generated by a transparent member 28 which is part of said optical body 4 or is continuous thereto.

For another embodiment said plate glass holding plate assembly is made up of at least two plate glasses and has as a feature a step or level difference St there between (see FIGS. 6 (A-A) to 21. Said plate glasses G1 and G2 have different inclinations or radio of curvature different from one another can enlarge the field of vision with respect to a single mirror, but furthermore in said step they can have a test light outlet Li2 by means of the light deflection member 28 provided with reflective optics 4 and prismatic 11 means oiN for directing the light dv (see FIG. 7) using the same light source which emits the turn light signal in the second light module D2.

The visible outer rim of said structure PG especially in the rim of the step St has a rounding radius greater than 1 mm due to being projecting with respect to the frame of said rear-view mirror Fr in order to not cause accidents when touching them.

Said step has a sound outlet when the module is part of another type of signal such as the early open door warning.

For another embodiment in said step it has an outlet of the welcome light WL, or reverse light RL oriented towards the bodywork of the vehicle and in this case formed by a module D2a which can be part of the optical body 4 itself or independent of it but associated in the plate glass holding plate assembly PG (see FIGS. 6 (A-A), 7, 13 to 22, 24, 27).

Said module D2G has a light source formed by a printed circuit PCB 20, horizontal and parallel to the light distribution plane P, with at least one LED 30 located under said cones 7c; or has said PCB 20 perpendicular to said light distribution plane P and couples the light by means of standard light inlet optical devices 6 (see FIGS. 8(A-A), 7, and 23).

Said PCB can be made up of a metal plate with the conductive tracks printed in substrates or in a fiberglass or polyester supporting substrate associated with said metal plate, or a circuit 20 printed on both faces and interconnected by thermal paths, to better dissipate the temperature of the LEDs.

Said plate glass G2, upon being at a more outward level or step than the plate glass G1, has underneath a volume which allows placing a video camera V or infrared IR emitters receivers or a PCB as a radiofrequency antenna associated with a signal amplifier, filter or emitter; the purpose of these elements is to detect the presence or approach close to the vehicle in the direction Rv of vehicles, or intercommunicating therewith, with any type of frequency or encoded language, when opening the door to emit a signal and working as a complement of a door opening or driving maneuver system, giving a sound or visual warning signal, or blocking or delaying the opening of the door by one instant.

Said video camera or sensors work through the plate glasses G1 and G2 which protects them against the elements by a small window which is obtained upon treating said plate glass with laser such that it pulverizes the reflective metal coating thereof at high temperature, as with the protective circuit of the LEDs 21, the electronic interface of said camera, sensor, antenna or part of it is in another part of the rear-view mirror or of the vehicle, preferably in the signal module D1 to prevent the theft of the plate glass holding plate-light signal-sensor assembly, antenna or presence camera. But said sensor system associated with the operating indicator sub-module Li2 thereof can also be integrated and share the same interface or electronic circuit 20, 21 forming a single assembly under a plate glass G1, or G2.

The plate glass-mirror assembly consists of a single plate glass G1, or a semi plate glass G2 added, adhered or fixed above the existing one; or a composite plate glass G1+G2+ multisignal module D2G assembly as a replacement of the existing plate glass without signal or its more equipped variants with, furthermore, a presence sensor or camera Cv, or radio frequency antenna RF.

The antenna located under any of said plate glasses is of the RF condensed type printed on a PCB or the supporting circuit 20 itself of said LEDs printed on the other face and, simultaneously to being an antenna, it acts as a dissipater of the temperature of the LEDs of the signal module; or it is an independent PCB, the function of the antenna for interacting with the operating indicator sub-module Li2 allows intercommunicating with other vehicles or emitters-receivers with any type of radiofrequency signal RF which is directed, encoded or with an exchange language of the Wi-Fi type, for example.

Other references of the rear-view mirror assembly with two associated signal modules D1, D2 are:

An outer transparent cover 1 or 11 of said modules D1 and D2 which, when it is one and the same part for one or more functions, have a surface S or separation sector between the reflectors or cavities 12 or the inner body 10 of the same signal or of different signals formed between the outer transparent surface 1 close and parallel to said surface of the inner part 10 or 12 (see FIG. 4).

Rx: It is a surface formed by the association between the transparent surface 1 and part of the reflector 12 when they are close and parallel, the surface formed is a layer-on-layer surface and its appearance given by the inner surfaces is smooth, transparent, engraved or has parallel bands formed by parallel cylindrical sectors or any type of geometric engraving in positive or negative small or bas relief, with inner relief or another type of decorative machining, as an extension of the assembly of signal or it is a separation S or surface between the cavities between equal or different functions which uses the adjacent surface upwardly or under said cavity of signal.

Said surface Rx or S between the light outlets of the different signals acts as a separator thereof and to prevent the transmittance of light from one signal to another. Thus, the front signal module takes up a large surface on the exterior rear-view mirror assembly similar to a casing cover C, which is not a cover, is a signal module with parts taken up by said surfaces Rx or S which do not emit light, their function is decorative and for the reflection-absorption of the outdoor light Ob1.

As a complement to the fixing, the signal modules D1, D2 have longitudinal ribs 5 at least in one part of the perimeter of the opening comprising said modules, which consists of an extension towards the inside of the casing cover C, or Cc, of at least 1 mm in depth towards the inside of said rear-view mirror assembly, the function thereof is to provide stability, rigidity, facilitate the integration and assembly of a strongly attached cover-signal assembly.

For the fixing thereof it uses teeth for fixing or positioning the signal, fixing clips for fixing to the casing or for fixing parts of the rear-view mirror structure to one another.

Other references:

15: Fixing screws for fixing to the casing, part of the rear-view mirror structure or assembly or between components inside the module, for example, radiator cover R.

Other forms of stable fixing are by welding, adhesive or gluing.

The front modules or modules towards the rear in a structural part can abut with one another and integrated such that they become a unit, such as the first module D1+casing cover or D2+frame casing, for example (see FIG. 3).

Other references:

(10) Inner body of the signal or support of the interface, which for one embodiment can take up an outer part above the second module (D2), as a protective plate (Cp) for the latter, in the extreme outer area.

12: Interior reflector or interior reflective surfaces, metal-coated or colored, smooth or with facets, such that they form a collimator.

Outer opaque structural parts and complements:

C: Normally painted casing cover which is partly associated with the frame casing D.

Cc: Lower casing cover, or complementary cover which normally takes up the position farthest from the body-work of said vehicle as a protection against tangential blows coincident with the extreme line XL, made of an extra-hard material or anodized aluminum (see FIG. 3, 4, 5.

Said cover or cover portion, when it is an outer opaque structural part of the casing cover C, Cc separating the multisignal modules D1 and D2, produces an area which does not emit light nL on the side, and said opaque area furthermore has a safety purpose since it is anti-blows and prevents failure due to breakage.

For another embodiment, since said modules are modules associated with one of said covers and are integrated as a cover-signal assembly, they form a replacement "kit" assembly with more or less functions or a different design.

A rear-view mirror with a simple plate glass G1 can receive as a spare part an additional plate glass of the type of G1+G2+ signal D2G with the sub-modules of the welcome light, reverse light D2a and the operating test Li2 which interacts with said camera+the video camera+the antenna RF sharing the same electronic base.

A plate glass G1 of a rear-view mirror can receive an additional supplementary plate glass G2+signal D2 which can abut with said plate glass G1 and connect said signal to a standard front signal D1 of the rear-view mirror, or receive a new plate glass G1+the module D2G (FIGS. 6(A-A), 7, and 22)

Other references:

SD Support of said rear-view mirror to the door, fairing or bodywork of the vehicle.

G1: Rear-view element, mirror or plate glass when it is only one.

G1 and G2 sub assembly: Rear-view element, mirror or plate glass in two levels with different inclination and level between said plate glasses forming a step St between said two parts, the option of being a supplementary plate glass G2 can be abutted on the first G1 acting as a base or is so formed by a plate glass holding plate PG which allows said level differences St.

S1, outer surface of the primary mirror reflection.

S2, outer surface spotter mirror reflection.

When the mirror is aspherical type, has 2 single crystal surfaces with different radius of curvature each separated by a line Lm.

S3—single external reflection surface of the aspheric mirror.

S4—reflection enhanced area of the aspheric mirror formed by curve in the end T3 surface of a mirror aspheric.

Lm: line from where the mirror radius of curvature changes, forming the spotter mirror Sc with integrated in an aspheric single crystal G1.

The reflected image on said curved surface Sc is framed between the two lines of light of said two different functions associated to each turn signal Li1 or other external vehicle sensor Li2.

Re: Depression or recess in the separation or step St, between G1 and G2 mirrors that produces a shadow 18 to better perceive the light emitted during the day, the driver's eyes Dv. FIGS. 9, 11.

y: angle of inclination of the beams 32 reflected inside the optic interface oiN.

Ab: abrasion or laser application in the metallic surface mirror to facilitate passage of the light emitted. FIG. 25.

Ac: Actuator or mechanism for positioning the plate glass G1.

iC: Electric cable for interconnection to the general electric circuit or to the controller which provides the functions or between said modules which passes to the door or bodywork of the vehicle. Normally, one of said signal modules, preferably the front one Cn: connector which is part of the inner body 10 of the signal module, it is such that two parts are connected to one another in an aerial manner although they can later be fixed to a structural part of said rear-view mirror.

D1 is provided with a protective circuit 21 which electronically protects the second module as well, especially when it is integrated in the plate glass G1 and, since it essential for operating, it produces an anti-theft measure, since said plate glass+the module D2 without said protective circuit does not work.

The different signal modules can combine and integrate more than one technique for producing light such as electroluminescent substrates referred to as OLEDS, comprising at least one electroluminescent substrate between two conductive substrates positive and negative and, in order to improve the contrast, it includes a dark or black non-luminescent substrate delimiting or separating the light areas produced by said electroluminescent substrate; they are used for the front part D1 for the turn signal complementarily with the second module towards the rear D2, or D2G the source of which is LEDs.

Other references:

H: Heater adhesive film located underneath the mirrors G1 and/or G2 and with marks or serigraphic imprints having a current conducting resistance properties resulting from the heating of these mirrors to the current flow 30: The light emitter LEDs of any type, forming the base of light emitters of said signals for all devices, with a configuration of the type of a single chip per capsule or multichip of more than one chip per capsule, or chips applied on a "chip on board" metal plate or with optical devices abutting with one another or integrated to said capsule.

20: PCB circuit made of fiberglass FV, tracks printed on a metal base, especially made of aluminum, or plastic laminate or tracks of folded metal or several tracks printed on both faces of the circuit, faces 20a, and 20b with thermal paths 22 connecting said tracks to one another, in turn associated with a metal support or body for dissipating the heat of the LEDs, such as polyester adhered to said metal base 23, for example.

21: PCB or part of the housing protection circuit, controller, or dimmer of LEDs that can be integrated in a single circuit 20 or forming separate PCB to better dissipate the temperature, or to prevent the theft of the subassembly mirror and spotter mirror G1+G2 when they have a turn signal lights D2G, lights demarcation Li1, Li2 or auxiliary light D2a.

Ve: Air inlet or outlet hole which is part of the thermal interface tiN and prevents condensation inside the device.

Ob1: It is the outdoor incident light on the optical interface oiN light emitters 20, reflectors 12, intermediate optical devices Op, light guides GL, or collimators Co.

Ob2: It is the reflected light to prevent outdoor incidence and improve the contrast.

9: Inner reflective or prismatic deflecting surface of the light of the actual signal inside the member 8 for directing it to another outlet surface Sw visible to the driver Dv as an operating indicator.

4: Transparent solid part forming the complex optical body.

7, 7c: Reflective cones distributing and homogenizing the light emitted towards the light outlet mirror Mpr.

Mpr: Prismatic light outlet mirror with a surface which is smooth, engraved or faceted with an approximate inclination of 45° with respect to the light distribution plane.

9: Reflective surfaces or covers preventing the escape of light in said body 4 in its course of distribution-reflection of the light, integrated by a metal-coated part or a cover painted with a reflective material, it covers a large part of the outer surfaces of the body 4 except the inlet 6, or 7 and light outlet 11.

1c: it crowns part of the transparent cover preventing the side diffusion of the light when the outer transparent cover 1 of the front module D1 has several windows.

11: Smooth, engraved or faceted light outlet surface which directs a light beam towards the rear Rb visible to the eye points Rv of behind the vehicle.

iP: Associated reflection parabolas with an irregular perimeter and shape for one or more LEDs per cavity, said cavities have a smooth, engraved or faceted surface, and their design corresponds to irregular shapes which fit with another similar inverted shape such that they allow optimizing the space remaining between cavities with circular or oval closed shapes, this type of cavity is preferably used for signals of the group D1 to the front, such as the fixed signal FL.

Pb: reflection parabolas or paraboloidal cavities at least occupied by a Led, each of them for the purpose of concentrating the light emission especially in the front signal FL the axes Fb1, Fb2 of which are preferably parallel, obtaining integral light beams to intensify the final result of the light emitted from said front signal FL.

The Leds of said signal FL are located in one and the same plane or in associated substantially parallel planes for the same reason of obtaining integral light beams to intensify the result of the emitted signal.

For all the embodiments and especially applicable to the light modules or devices continuously switched on, the latter have a thermal interface cooling the light source by means of a heat transmission chain based on the proximity of elements from said LEDs 30, until transmitting the heat outside said device or module, comprising at least one of the following elements, or a combination thereof:

a supporting printed circuit 20 with tracks that are widened around said LEDs 30.

thermal paths traversing said supporting circuit 20 for transmitting the heat of a first face 20 to a second face, opposite said first face 20, a metal base abutting with said second face of the supporting circuit 20, and an additional inner cover made of metal or heat conducting material, abutting with said metal base, having flaps, or outer ventilation channels.

In order to obtain a contrast on the low-intensity light emitted by said operating indicators of one or more described light colors Sw, Swe, Sw2, Li1, Li2, Li3 the latter have, for some embodiments, their small windows on a structural opaque part or opaque partition visible to the eyes of the driver Dv of the vehicle; said opaque parts can be part of the structural frame Fr, in most cases it is the inner part of said frame or opaque partition Fri, a portion of the inner part of the structural part Fr forming a perimetric frame, and delimits the bottom of said outer recess 19, or a side wall of said central recess 39 or part of the structure 10 of the module D2 itself, or said opaque partition Fri is a cover of said inner recess 29, which covers a part of the second light module D2 once it is housed in the inner recess 29, or for the embodiment in which the module towards the rear D2 is a module which is in the plate glass D2G, said opaque partition forms part of the frame FrG of the main plate glass G1 or auxiliary plate glass G2.

For one embodiment, at least one of said light modules D1, D1*a*, D1*b*, D1*c*, D2, D2G, D2*a*, Li1, Li2 comprises in its respective cavities technical means of a light emitting electro-optical interface eiN, oiN comprising at least one of the following elements, or a combination thereof; which allows developing with one and the same design configuration and one and the same electro-optical interface eiN, performing more than one function, varying their periodic emission frequency, or their emission intensity of continuous light, or of light perceived as continuous, or the light emission color. They comprise:

reflective surfaces 12 that are metal-coated or of any color including black;

reflective cavities comprising parabolas and having regular or irregular perimeters, especially with parallel axes for the front signal FL;

flexible supporting circuits 20, partly flexible, rigid or of several associated and interconnected plates, or printed on one or two faces, for direct light emission;

LEDs 30 inserted or assembled in equal or different positions normally or at an angle of 0° a 90° with respect to said supporting circuits of fiber 20, or flexible 20F, metal interconnected associated plates or folded metal or the combination thereof, preferably in parallel planes for the front signal FL;

at least one collimator Co or reflective surface having small associated facets, arranged for receiving the light emitted in a manner tangential almost parallel to said outer transparent or translucent cover 1, 11, and reflecting it axially for emitting indirect light;

light guides GL substantially parallel to the outer transparent surface for indirect light emission; and optical devices, Fresnel-type optical devices or interpolated prismatic optical devices Opr, or concentrating optical devices Op between the light emitters 30 and the outer transparent surface 1 or 1*a*, for the direct light emission such as, for example, see a group of intermediate prismatic lenses Opr in the turn signal which occupies the cavity D1*a* and the sections of FIGS. 10, 11, and 12. Or having one or several cavities or paraboloidal depressions with at least one emitter for each of them or having one or more windows for one and the same signal or using multichip LEDs with more than one chip for one and the same supporting capsule (see FIGS. 4, 6, 10, 11, 12, 13, 14). OR for a front signal FL.

As can be seen in FIGS. 6 (A-A), 7, and 22 the aforementioned portion of said supporting part PG where second light module D2, D2G is located comprises an area arranged behind the main plate glass G1 (see FIG. 5) or the auxiliary plate glass G2 (see FIG. 6), as well as an area arranged between the rim of the main plate glass G1 (see FIG. 5) or of the auxiliary G2 (see FIG. 6 (A-A)), or of a frame thereof. FrG, and said structural part forming a perimetric frame Fr.

In relation to the part of the first D1 or second D2, D2G light module comprising the aforementioned opaque wall Cp, the latter forms part, for one embodiment, of an inner rear wall or part of an inner supporting body 10 or of an electro-optical interface oiN of said first D1 or second D2 light module, and is opposite its respective outer transparent or translucent cover 1, 11. Specifically, for the embodiment illustrated by FIGS. 6, 7, part of the inner supporting body 10 of the first light module D1 forms the opaque wall Cp which covers a part of the second light module D2.

For the embodiment illustrated by FIG. 7, the aforementioned opaque partition forms part of the frame FrG of the auxiliary plate glass G2, such that it is arranged between the rim of said auxiliary plate glass G2 and the transparent or translucent cover 11 of the second light module D2G, projecting towards the rear with respect to the auxiliary plate glass G2, substantially concealing said opaque partition FrG with respect to the tangential vision Tv of the eyes of the driver of the vehicle Dv, the outer transparent or translucent cover 11 through which the second light module D2G emits the mentioned turn signal towards the rear the focal axis Rb of which is visible at eye points located behind the rear-view mirror and outside said vehicle Rv.

For another embodiment (see FIG. 11), the opaque partition forms part of the frame FrG of the main plate glass G1.

For the embodiments described above for which the structural part Fr forming a perimetric frame defines a recess 19, the mentioned opaque partition is arranged at the height of said recess 19, (see FIGS. 5, 10, 12 and 13), substantially concealing, with respect to the tangential vision Tv of the eyes of the driver of the vehicle Dv, the outer transparent or translucent cover 1 through which the second light module D2 emits the mentioned turn signal towards the rear the focal axis Rb of which is visible at eye points located behind the rear-view mirror and outside said vehicle Rv.

For the case in which the recess is an outer recess 19 or a central recess, the opaque partition forms part of the inner part Fri of said structural part forming a perimetric frame Fr, and for the case in which the recess is an inner recess, the opaque partition forms part of the inner body 10 of the second light module D2, of another element thereof or is a plate (not illustrated) of said inner recess, which covers a part of the second light module D2 once it is housed in the inner recess.

The opaque partition Fri, FrG, or step St has an opening or window Sw (see FIGS. 5, 7, 10, 11 and 22) which allows part of the light signal emitted by the second light module D2, D2G, or lights marking Li1, Li2, or auxiliary light D2*a* to be able to be seen at least in a direct direction dv from the eyes of the driver of the vehicle Dv.

As seen in FIGS. 8 to 12 said window Sw is taken up by a transparent or translucent part traversed by part of the light signal emitted by the second light module D2, D2G with a focal axis towards the rear Rb visible at eye points located behind the rear-view mirror and outside said vehicle.

Said transparent or translucent part is, for the embodiments illustrated by said FIGS. 8 to 23, a transparent or translucent member 28 the outer surface of which is smooth, engraved or has micro facets, and is integrated in said transparent or translucent part 4 of the second light module D2, D2G.

At least one of said light modules or devices D1, D1a, D1b, D1c, D2, D2G, D2a or mirrors G2 and G1 which include Li1, Li2 and D2a, is capable of being changed with another similar part provided with one or more signal emitting modules with equal or different functions or with at least one module of different design.

For an embodiment (FIGS. 6 to 9) we have a multifunctional external rear-view mirror assembly of a vehicle that has an associated sub-assembly of mirrors, formed by two independent mirrors, a generally flat main one G1 and an auxiliary spotter mirror G2 that are integrated in the same plate of support PG but present two independent surfaces of external reflection S1 and S2 separated between them by a partition and a division of another material, preferably as an opaque step St, said mirrors have a different inclination and radius of curvature in said external surfaces of reflection between them, so to obtain a continuous image (this continuous image facilitates the difference in height of the step St) and widen the field of view of the sub-assembly of mirrors.

In said step, partition or division St, it has a re-sunk surface Re protected by the incidence of the direct solar light Ob1 during the day that coincides partly with the perimeter of said spotter mirror G2 and has in said protected re-sunk surface, at least a first part of a line of emission of indicating-demarcating light Li1, oriented to the eyes of the driver of the vehicle Dv, associated to a second part of another line of emission of indicating-demarcating light Li2 also oriented to the eyes of the driver of the vehicle so to indicate and demarcate between said two lines, the image reflected in the spotter mirror G2, in different situations of traffic, with the advantage of catching the attention automatically and being, said indicating-demarcating lights, easily visible during the day.

Said associated lines of emission of light Li1 and Li2 that partly surround the reflected image in the spotter mirror G2 are of different colors between them and each one is activated as a response to different devices, a first line of light, responds automatically to an external sensor of the vehicle, and a second line of light responds to the use of the turn signal D1, D2 or D2G.

Besides, that sub-assembly of mirrors has another associated device D2a that produces light emitted as a function of comfort and help, when parking RL, or when boarding the vehicle WL combining the functions according to a variable selection among:
  line of indicating light as a sign of the functioning of the turn signal Li1, oriented to the eyes of the driver Dv, that captures automatically the attention of the driver, demarcating a part of the reflected image on said spotter mirror G2;
  line of light of warning Li2 oriented to the eyes of the driver Dv that demarcates the reflected image on said spotter mirror G2 as a response to an external system of detection of the vehicle.
  associated lines of light of demarcation Li1+Li2, directed to the eyes of the driver that demarcate the reflected image on the spotter mirror as a response to the functioning related to the turn signal and an external system of detection Li1 and Li2.
  lines of light of warning and demarcating of the reflected image, oriented to the eyes of the driver or the passenger that works before or during the opening of the door of the vehicle in an independent manner or associated Li1 and Li2.
  light that illuminates the door of the vehicle before boarding it as a welcome WL, from an independent device or associated to the sub-assembly of mirrors.
  light that illuminates the side of the body of the car when using the reverse gear RL, without directly having an impact in the eyes of the driver, from an independent device or associated to the sub-assembly of mirrors.

We also see that the light part of that indicator light projected toward Li1 view from behind by at least one beam signal Rv intermittent complementing D2; there is also a complimentary device D2a, Fr located within the body of the mirror, whose light is directed to the vehicle door WL to produce a welcoming light, and extends back and down when actuated to connect the fly reverse producing an auxiliary light RL reversing light illuminating a side area of the vehicle.

Note that there is a separation between the gp mirror reflector assembly G1 and G2 and the frame Fr, therefore such demarcation lights Li1 and Li2 are arranged close to the body frame Fr of the mirror, such that said frame provides an area of shadow 18 in response to the incidence of a beam of sunlight external Ob1, thus solves the problem clearly see the light emission of said indicator lights during the day.

The step St between said two mirrors G1 and G2 has, in its projecting edge, preferably a radius R1 (FIG. 7) bigger than 1 mm and allows those mirrors to have a different orientation and radius of curvature to widen the field of vision of the reflected image and allows having a continuous image as a result of two independent mirrors (according to the tangent tg on the border of the spotter mirror, FIG. 9), that substantially levels in a parallel way the surfaces of reflection adjacent to said step in order to give a reasonable continuity to the reflected image.

For another application, we employ an aspherical mirror also allows us to obtain an extended reflection and continuous; said mirror (FIGS. 23-28), consists of a single crystal and a single external surface has a curvature variable:
  Two thirds in the body closer to T1, T2, is flat or of a greater radius of curvature and S3,
  In the third T3, furthest from the body, indicated by a partition or line Lm, has a smaller radius of curvature allows that part of its outer curved surface Cs obtain an extended field of view.

Said aspherical mirror as FIG. 24, is a single mirror with a single external surface S3-Cs for viewing enlarged angle of reflection.

No spotter mirror and no step, so that the lines of demarcation and associated indicator light Li1 and Li2 that demarcate the reflection in the area of greatest curvature Cs; a technique employing an optical inter phase oiN indicator light directed toward said driver's eyes by reflection Dv, inside a body optical 4, mirror located below G1 that to facilitate the light output 11 is a linear zone treated by abrasion or laser Ab. Complete set D2a device that produces light of welcome and/or reverse light WL and RL located on the perimeter of the glass plate in the bottom third body next to T1, this means that said light does not impinge on the driver's eyes Dv in the function reverse light RL. FIGS. 25 y 26.

For guiding said light indicator Li1, Li2, towards the driver's eyes, the optical interface is oiN angle "y" the reflected light beams 32 within the optical body 4 to guide light beams such indicator lights Li1 and Li2 associated to demarcate the reflected image, into the driver's eyes Dv.

For this example embodiment the two lines that demarcate one associated light image used:

A first line of demarcation indicator light Li2, which responds to an automatic detection of an external sensor, uses a technique similar to FIG. 25, 26 is located below the mirror;

A second indication demarcation line Li1 associated, which responds to a different function voluntary action by the driver (turn signal) is at the outer perimeter of the mirror in zone T3, with a similar technique used in FIGS. 8, 9, 14, 15, 16 and 17.

For other embodiments, when said mirror assembly has a sub-assembly of mirrors formed by a main mirror G1 and an auxiliary or spotter mirror G2 or a spotter mirror forming a mirror set that occupies the first opening Op1 of the body C, delimited by a frame Fr, independently that in said body C or frame Fr it had some signal device, said mirror set G1+G2 has indicating light as a sign of functioning to demarcate, center, focalize the reflected image in different situations in order to help the driver of said vehicle, said emitted light by the indicating devices Li1, Li2, goes directed in an attenuated way to the eyes of the driver Dv; FIG. 25.

Then we observe the following embodiments:

Embodiment according to FIGS. 14, 15, said mirror assembly has the devices that work as signals D1, D1a, D1b, D1c, D2 that are in the body C and occupy the second opening Op2 (FIGS. 3 and 4), or in the frame Fr and make the external signals selected from (turn signal), Frontal light F1 or side light SL; we have a mirror sub-assembly integrated by a main mirror G1 and a little spotter mirror G2, with a different inclination and radius of curvature and normally forms a step St between them in order to amplify the reflected vision, said step St is even used to having a shadow area 18 or a re-sunk that improves the vision of light emitted during the day. Said spotter mirror G2 has some indicating lights at least in a part of its perimeter.

a first indicating light Li1 as a sign of functioning and demarcating the reflected image, that works (after the voluntary action of the driver), the signal of turning of the vehicle.

a second light of warning Li2 and demarcating of the reflected image as an automatic response to the activation of an external system of detection of the vehicle.

Also, any of those lights have a second function as a light of warning and demarcating of the reflected image that works before or during the opening of the door of the vehicle.

We note that for this embodiment the frame Fr of said mirror assembly has a comfort device D2a that works as:

a light of welcoming WL that illuminates the door of the vehicle before boarding the same.

a light that illuminates the side of the body of the vehicle while using the reverse gear RL, without making a direct impact in the eyes of the driver.

Another embodiment according to the FIGS. 16, 17, said mirror assembly is of similar characteristics as the one in the FIGS. 14 and 15, but it has included in said sub-assembly G1+G2 the perimeter of said spotter mirror G2, or in the step St formed between both mirrors, a lighting device of comfort D2a, that provides illumination (WL, RL, D2a) of a selected zone of the vehicle door (WL, Da), or when using the reverse RL said light beam is oriented towards the rear wheel RW, in this embodiment reverse RL emits a beam auxiliary BD back and down on the side of the vehicle, that do not bother directly or indirectly the driver's eyes Dv. (FIGS. 7, 8, 9, 10, 11, 12, 13, 17 a 22, y 25).

Another embodiment according to FIG. 20, said mirror assembly is of similar characteristics to the one in the FIGS. 14 and 15, but it has in said sub-assembly G1+G2 the variation that:

said first indicating light Li1 as a sign of functioning and demarcating the reflected image, occupies all the perimeter of the spotter mirror G2 and coincides with the exit of light of warning and demarcating Li2 sharing the optical means but with a different source of light in color, as a response to different functions.

and that second light (warning) Li2 and demarcation of the reflected image in response to an external sensing system of the vehicle is placed inside or outside and at a location adjacent the perimeter of said spotter mirror G2 which employs a laser or mechanical abrasion technique in a piece of the surface of said mirrors G1 or G2 to facilitate the exit of light.

other embodiment according FIG. 20, said mirror assembly is of similar characteristics to the one in the FIGS. 16 and 17, in said sub-assembly G1+G2, the device of the second light of warning and demarcating of the reflected image occupies at least two opposed parts that are illuminated Li2 and Li3 of the perimeter of said spotter mirror G2 in order to center the image where you have to watch before the warning.

Another embodiment according FIG. 21, said mirror assembly is of similar characteristics to the one in the FIGS. 16 and 17, but it has in said sub-assembly G1+G2:

a first indicating light Li1 as a sign of functioning of the turn signal.

a second light of warning Li2 as a response of an external system of detection of the vehicle.

Said light exits Li1, Li2 are arranged in an opposite way between them, covering a part of the perimeter of said spotter mirror G2, one of said lights Li1 is on the most external side and the other one Li2 is on the closest side with respect to the body of the vehicle Car and with a similar shape to the mathematical signs of excluded/included in order to differentiate the warning from the reflected image and the action to follow by the driver of the vehicle. When using the turning signal, Li1 remembers that the vehicle is going somewhere and when it receives the warning light Li2, indicates that an intruder is getting close to the vehicle.

In all embodiments described from the FIGS. 14 to 21, we observe that it is an advantage that at least a part of the exit of light of the devices Li1 and Li2 that are in said sub-assembly G1-G2 that occupies the first opening Op1 of the mirror assembly.

As shown in FIGS. 16, 18 and 20 said first opening encompassing said first and second reflective elements and said frame (Fr) providing a shadow area (18b) to sunlight (Ob1) or external light at least around a part of said spotter mirror G2, and said marking light Li2 is located at least partially within said shadow area 18.

In the embodiments described in FIGS. 6 to 9 optical and electronic means forming an optical interface oiN, and electronic interface eiN that can have several constructive characteristics and forms of activation are shown.

FIGS. 7 and 9 show first and second indicator lights Li1, Li2 and contort lights WL RL of the module D2a, are obtained by an optical plate 4 superimposed to the back of said spotter mirror G2 and a light source 30 coupled to a light access edge 6 of said plate. The optical plate 4 has the face contacting with said back of said spotter mirror G2 is opaque to the light.

Cited optical plate 4 is superimposed to the back of said spotter G2 by an injection process in bi-material.

FIG. 3 and FIG. 24 show a heater film is interposed between said optical plate and said back of said second auxiliary reflective element G2. FIG. 3

FIGS. 3 and 7 show a protective circuit 21 for controlling and stabilizing electrical current feeding at least a light source 30 providing said indicator lights Li1, Li2, said protective circuit being located in the embodiment of FIG. 3, outside said backing plate PG.

At least one of said indicator lights Li1, Li2 and turn signal module D1, D2 are activated by a sensor-switch-detector located in the drive system of the door opening, before or during the opening of the door Module D2a provides reverse comfort light RL and operates in conjunction with the reverse lights of the rear of the vehicle and are connected thereto by wire or radio frequency activation of a driver circuit which acts on said module D2a.

Subassembly SA including said main mirror G1 and spotter mirror G2 can be constructed as an autonomous unit that can replace any rear-view mirror of a given vehicle mirror.

In the embodiments of FIGS. 18-21 said indicator lights Li1, Li2 or comfort lights RL, WL comprises differentiated portions of the perimeter of said spotter mirror G2 to center the image in response to activation of the turn signal or a warning.

Indicator lights Li1, Li2 perform several functions, such as:
Witnessed turn signal operation, or
Warning in response to detection of an object in a particular blindzone, or
Warning when opening the door.
using some of the same optical media oiN and the same light output surface 11 on the perimeter of the spotter mirror G2, but changing the color or frequency of an intermittent light source 30.

Figure 22:
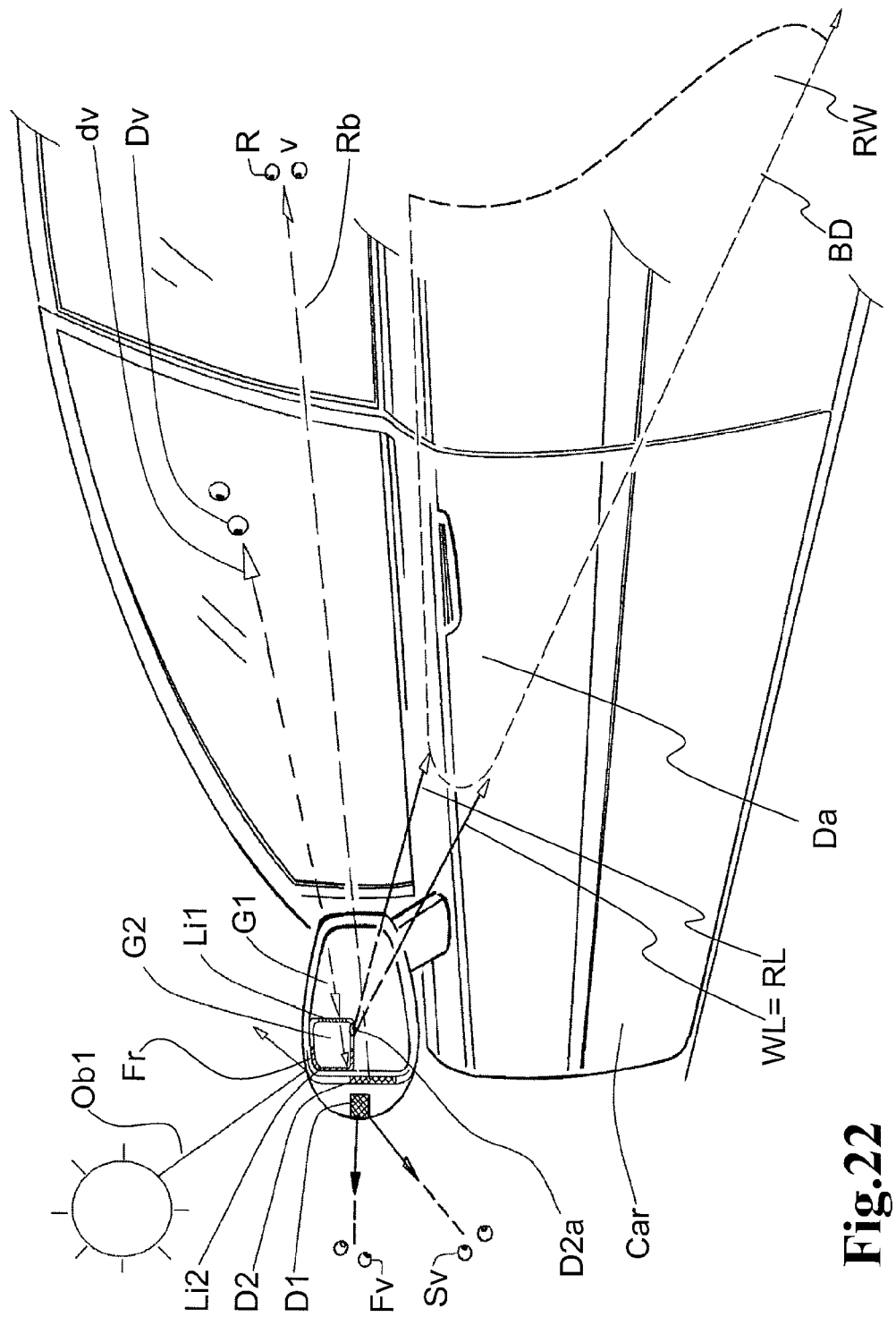
FIG. 22 is a perspective view of the side of a vehicle, showing the projections of the beams of the different light indicators, and light signals.

Subset or subassembly SA including main mirror G1 and spotter mirror G2 can be exchanged in the assembly A mirror for another that has different functions selectable between:
Heater H,
Marking light for localization Li1 mirror when operating turn signal.
Light indication for localization Li2 when operating and activation of a blindzone object detector of the vehicle in response of another vehicle detected.
Welcome light WL providing illumination D2a of a selected zone Da of the vehicle door.
Reversing light RL providing illumination D2a of a selected zone Da, RW of the vehicle side of the vehicle to operate the reverse.
Temperature sensor T.
Radiofrequency antenna RF.
Video cameras Cv.
Sound emitting device Sd.
P painted optical body in optical interface oiN.
Part of the optical media oiN of said indicator lights Li1, Li2, Li3, WL, RL, are painted to facilitate internally reflected light toward the light output of the optical media by function and not transmitted to other neighboring elements FIG. 22 is a perspective view of the side of a vehicle, showing the projections of the beams of the different signals or indicator lights provided by the rear-view mirror assembly proposed by the invention. Said figure specifically shows that:
the associated light modules D1 and D2 emit a visible turn light signal towards the front, side and rear, at eye points towards the front vision Fv, towards the side vision Sv and towards the back of the vehicle or rear vision Rv.
light device D2a produces at least one of the following functions:
reversing light RL, by means of a light beam BD to the back and down of the vehicle, to an area near a rear wheel RW on the side of the vehicle; said light beam BD oriented to the back and down will never run directly or indirectly towards the driver's eyes.
welcome light by means of a beam WL which lights up an area of the door Da between the eye points of the driver Dv and those from the rear of the vehicle Rv.
indicator light Li1 in response of an action of the driver, detection of an approaching vehicle or in response to a turning maneuver without turning signalization
indicator light Li2 activated in response to a light turn signal activation Both light indicators Li1 and Li2 provide a light beam directed towards the driver eyes and can be distributed in several points providing additional beams, such Li3 previously disclosed.

Figure 23:
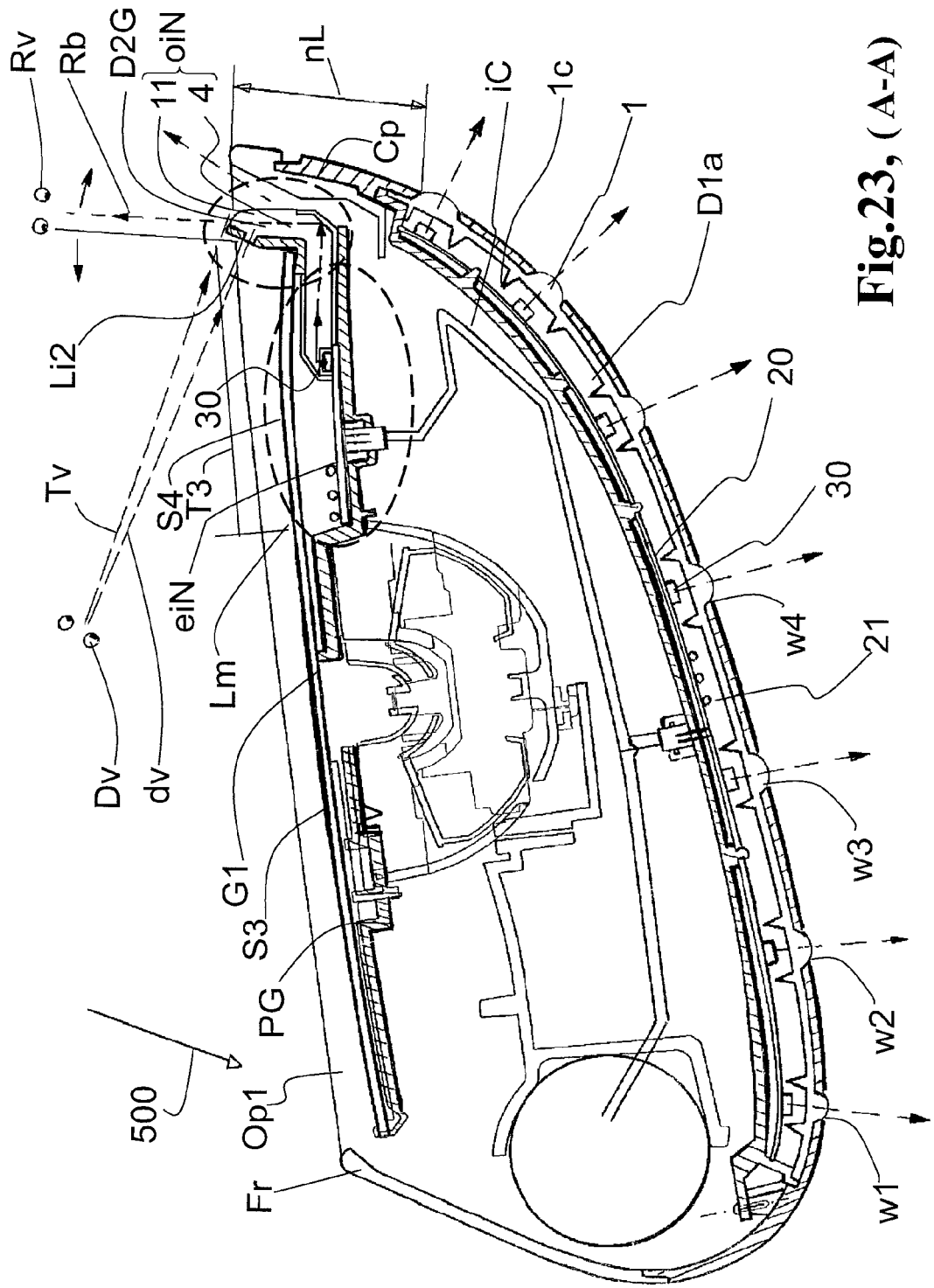
FIG. 23 is a cross-section view taken along line (A-A) of FIG. 5.

In FIG. 23 a front turn signal from a light device D1a is emitted through separated windows (W1, W2, W3, ... ) and an associated light module D2G emits the same turn signal but visible from the rear Rv. Light module D2G in this embodiment is located in the support PG holding mirror G1. An electro-optical interface eiN is under the mirror G1 which in this embodiment is an aspheric mirror. G1 is a single mirror with one outer surface S3 and an area of greater curvature S4 located in the farthest zone T3 (FIG. 3 definition)

FIG. 24, is a frontal elevation view of another embodiment of a mirror assembly which has an aspherical mirror as FIG. 23, i.e. is a single mirror with a single external surface with two areas S3-S4, the latter for viewing enlarged angle of reflection.

This embodiment has no step so that the lines of demarcation and associated indicator lights Li1 and Li2 only demarcate the reflection in the area of greatest curvature S4.

A light device D2a produces light of welcome and/or reverse light WL and RL located on the perimeter of the glass plate in the bottom third body next to T1, this means that said light does not impinge on the driver's eyes Dv in the function reverse light RL.

FIG. 25 is a section AA of FIG. 24 in perspective and detail of the optical interface oiN where angle "y" of the reflected light beams 32 within the optical body 4 have been indicated to guide said light beams dv from Li1 and Li2 indicator lights of the area S4, into the driver's eyes Dv.

FIG. 26 is a detail in transparency of FIG. 24, where we the technique of the interface electro-optical eiN-oiN underneath the mirror and support plate PG is indicated.

A heater H is provided as a film adhesive between the parties.

FIG. 27 is a front elevation view of a mirror with an aspheric mirror as FIG. 24, but in this embodiment two lines that demarcate the area acting as spotter mirror are used.

A first line of demarcation indicator light Li1, which responds to an automatic detection of an external sensor, uses a technique similar to FIG. 25, 26 located below the mirror;

A second indicator demarcation line Li2 associated, which responds to a different function voluntary action by the driver (turn signal) is at the outer perimeter of the mirror in zone T3, with a similar technique used in FIGS. 8, 9, 14, 15, 16 and 17.

FIG. 28 is a cross section (A-A) of FIG. 27 and similar to FIG. 5, with an aspheric mirror. It shows the combination of techniques for Li1 indicator light on the perimeter of the mirror not under the glass, with an Li2 indicator light technique, with an indicator light located below the mirror G1 so that between the two lines demarcate an image associated to one part of the mirror.

The invention claimed is:

1. A rear-view mirror for a vehicle with a set of indicator lights, comprising:
    a mirror housing composed of structural parts, cover, frame and support fixed to the vehicle;
    a first reflective element having a first field of view;
    a second auxiliary reflective element that is a spotter mirror having a second field of view, said first and second reflective elements being at different levels and connected by a step that is arranged to face a driver's eyes of a driver of the vehicle;
    a first indicator light performing several warning functions, in association with a light source, said first indicator light issuing at least a light beam directed towards a driver's eyes to highlight or demarcate said spotter mirror in response to an action of the driver, in response to a detection of an approaching vehicle or a vehicle that is advancing with an indication of lane, or in response to a turning maneuver without turning signalization;
    wherein said first indicator light is located in said step of the spotter mirror in a shadow area provided by the step so that the incident daylight or incident external light does not disturb the perception of said first indicator light by the driver,
    wherein said first indicator light placed at said step is located behind a respective hole in a recess of a wall of said step so that said indicator light is protected against daylight or external light.

2. The rear-view mirror according to claim 1, wherein said demarcation of the spotter mirror is completed by a second indicator light placed at said step or in a zone of a support of the spotter mirror adjacent thereof and furthest away from the vehicle and said second indicator light being activated in response to a light turn signal activation.

3. The rear-view mirror according to claim 2, wherein both said first and second indicator lights are placed at said step are located behind a respective hole in a recess of a wall of said step so that said indicator lights are protected against daylight or external light and are within the shadow area.

4. The rear-view mirror according to claim 2, wherein said second indicator light providing a light for a spotter mirror demarcation being at least in part in a distinctive color from color of said first indicator light.

5. The rear-view mirror according to claim 1, wherein said first indicator light for indication of the spotter mirror is activated in a distinctive color in response to the activation of a blindzone object detector installed in a vehicle equipped with said rear-view mirror and suitable for detecting an approaching vehicle, and providing a sound indication to said driver within said equipped vehicle and said blindzone corresponding to the side covered by said mirror.

6. The rear-view mirror according to claim 2, wherein said first indicator light and said second indicator light are differentiated in color or flash intermittently with a different frequency.

7. The rear-view mirror according to claim 2, wherein said first and second indicator lights comprises at least a light source and an electro optical interface to distribute said light in a predetermined direction.

8. The rear-view mirror according to claim 7, wherein said second light indicator uses a light source providing said light turn signal.

9. The rear-view mirror according to claim 1, wherein said mirror housing comprises a structural part forming a frame defining the contour of a first opening towards the rear with reference to the axis of travel of the vehicle, and said first opening encompassing said first and second reflective elements and said frame providing a shadow area caused by said daylight or external light at least around a part of said spotter mirror, and said second indicator light is located at least partially within said shadow area.

10. The rear-view mirror according to claim 4, wherein said mirror housing further including at least one front opening encompassing a first light module suitable for emitting at least a turn signal through said front opening provided with a translucent or transparent surface for the passage of light directed at least in a horizontal plane towards the front and towards the side with reference to said axis of travel of the vehicle.

11. The rear-view mirror according to claim 1, wherein further comprising another light module, placed at said step which emits an auxiliary beam back and down on the side of the vehicle that does not bother directly or indirectly the driver's eyes and provides illumination of a selected zone of the vehicle extending to a rear part of the vehicle.

12. The rear-view mirror according to claim 11, wherein said selected zone is any of a door area including an opening knob/handle or a lateral area encompassing a rear wheel.

13. The rear-view mirror according to claim 12, wherein further comprising another light module which emits an auxiliary beam back and down on the side of the vehicle, that does not bother directly or indirectly the driver's eyes and providing illumination of a selected zone of the vehicle extending to a rear part of the vehicle, and said first and second reflective elements forming a subassembly supported by at least a backing plate, said another light module is located in a perimetrical zone of said subassembly or in the frame.

14. The rear-view mirror according to claim 13, wherein said selected zone is any of a door area including an opening knob/handle or a lateral area encompassing a rear wheel.

15. The rear-view mirror according to claim 13, wherein said another light module is activated by a remote command, a closing door detector or by a signal from a reverse of the vehicle.

16. The rear-view mirror according to claim 1, wherein said first indicator light is obtained by an optical plate superimposed to a rear part of said spotter mirror and said light source coupled to a light access edge of said plate.

17. The rear-view mirror according to claim 16, wherein said optical plate is superimposed to the rear part of said spotter mirror by an injection process in bi-material.

18. The rear-view mirror according to claim 16, wherein a heater film is interposed between said optical plate and said back of said spotter mirror.

19. The rear-view mirror according to claim 13, wherein said rear-view mirror has a protective circuit for controlling and stabilizing electrical current feeding at least said light source providing said indicator light, said protective circuit being located outside said backing plate.

20. The rear-view mirror according to claim 1, wherein said first indicator light being activated by a sensor-switch-detector located in any door opening, said sensor being before or during the opening of the door.

21. The rear-view mirror according to claim 15, wherein said another light module work in conjunction with the reverse lights of the rear of the vehicle and are connected thereto by wire or radio frequency activation of a driver circuit which acts on said another light module.

22. A rear-view mirror for a vehicle with a set of indicator lights, comprising:
- a mirror housing; composed of structural parts, cover, frame and support fixed to the vehicle,
- a first reflective element having a first field of view;
- a second auxiliary reflective element or spotter mirror having a second field of view,
- said first and second reflective elements being at different levels and connected by a step facing the driver's eyes;
- a first indicator light performing several warning functions, in association with a light source, said first indicator light issuing at least a light beam directed towards a driver eyes to highlight or demarcate said spotter mirror in response of an action of the driver, in response to a detection of an approaching vehicle or a vehicle that is advancing with an indication of lane, or in response to a turning maneuver without turning signalization;
- wherein said first indicator light is located in said step of the spotter mirror in a shadow area provided by said step so that the incident daylight or incident external light does not disturb the perception of said first indicator light by the driver; and
- wherein a subassembly including said first and second reflective elements is an autonomous unit suitable to replace any reflective element of a given vehicle mirror, said subassembly further including a heater, a temperature sensor a radiofrequency antenna, a video camera, and a sound emitting device.

23. The rear-view mirror according to claim 1 wherein said first indicator light comprises differentiated portions of the perimeter of said spotter mirror, surrounding said perimeter, to center a reflected image.

24. The rear-view mirror according to claim 1, further comprising means for changing color of said light source or its frequency operating as intermittent light and providing said indicator lights allowing to perform different functions available using some of the same optical interface and the same light output surface on the perimeter of the spotter mirror but changing the color or frequency of said light source, said different functions including a witnessed turn signal operation, a warning in response to detection of an object in a particular blindzone, or and a warning when opening the door.

25. The rear-view mirror according to claim 1, wherein further comprising means for controlling intensity of a light source providing said indicator light to dim enough to avoid harm to the driver's eyes.

26. The rear-view mirror according to claim 2, wherein each of said first and second indicator lights has its own independent source.

27. The rear-view mirror according to claim 7, wherein at least part of said optical interface (oiN): include painted portions.

28. A rear-view mirror for a vehicle with a set of indicator lights, comprising:
- a mirror housing; composed of structural parts, cover, frame and support fixed to the vehicle,
- a first reflective element having a first field of view;
- a second auxiliary reflective element that is a spotter mirror having a second field of view, said first and second reflective elements being at different levels and connected by a step that faces driver's eyes of a driver of the vehicle;
- a first indicator light performing several warning functions, in association with a light source, said first indicator light issuing at least a light beam directed towards a driver eyes intended to highlight or demarcate said spotter mirror in response of an action of the driver, in response to a detection of an approaching vehicle or a vehicle that is advancing with an indication of lane, or in response to a turning maneuver without turning signalization; and
- wherein said first indicator light is located in said step of the spotter mirror so that the incident daylight or incident external light does not disturb the perception of said first indicator light by the driver.

* * * * *